United States Patent
Igarashi et al.

(10) Patent No.: US 8,212,468 B2
(45) Date of Patent: Jul. 3, 2012

(54) DISPLAY APPARATUS

(75) Inventors: Takahiro Igarashi, Kanagawa (JP);
Tsuneo Kusunoki, Kanagawa (JP);
Katsutoshi Ohno, Tokyo (JP)

(73) Assignee: Sony Corporation, Tokyo (JP)

(*) Notice: Subject to any disclaimer, the term of this patent is extended or adjusted under 35 U.S.C. 154(b) by 1199 days.

(21) Appl. No.: 11/672,364

(22) Filed: Feb. 7, 2007

(65) Prior Publication Data

US 2007/0188072 A1 Aug. 16, 2007

(30) Foreign Application Priority Data

Feb. 10, 2006 (JP) .................. 2006-034545

(51) Int. Cl.
*H01J 1/62* (2006.01)
*H01J 63/04* (2006.01)

(52) U.S. Cl. ....................... 313/503; 313/486

(58) Field of Classification Search .................. 313/486, 313/503
See application file for complete search history.

(56) References Cited

U.S. PATENT DOCUMENTS

| 2004/0032204 | A1* | 2/2004 | Wang et al. | 313/503 |
| 2004/0130256 | A1 | 7/2004 | Juestel et al. | |
| 2004/0252260 | A1* | 12/2004 | Nishida et al. | 349/107 |
| 2005/0264721 | A1* | 12/2005 | Lee et al. | 349/106 |

FOREIGN PATENT DOCUMENTS

| JP | 2001-242459 | 9/2001 |
| JP | 2002-296412 | 10/2002 |
| JP | 2003-121632 | 4/2003 |
| JP | 2004-101705 | 4/2004 |
| JP | 2004-163902 | 6/2004 |
| JP | 2004-520699 | 7/2004 |
| JP | 2005-353650 | 12/2005 |

OTHER PUBLICATIONS

Japanese Office Action issued on Jan. 5, 2010 for corresponding Japanese Patent Application 2006-034545.

* cited by examiner

*Primary Examiner* — Toan Ton
*Assistant Examiner* — Zachary Snyder
(74) *Attorney, Agent, or Firm* — K&L Gates LLP

(57) ABSTRACT

A display apparatus is provided. The display apparatus includes a light source apparatus including a white light source, a blue fluorescent material, a green fluorescent material, a red fluorescent material, a green color filter, and a red color filter. A green chromaticity point of an output of green light to be omitted from the green fluorescent material and a red chromaticity point of an output of red light to be emitted from the red fluorescent material on a chromaticity coordinate system are interconnected by an imaginary straight line which passes only points which are equal to or higher than (0.300, 0.600) with regard to at least one of an x-axis component and a y-axis component of the chromaticity coordinate system.

20 Claims, 6 Drawing Sheets

DISPLAY APPARATUS

CROSS REFERENCES TO RELATED APPLICATIONS

The present application contains subject matter related to Japanese Patent Application JP 2006-034545 filed in the Japanese Patent Office on Feb. 10, 2006, the entire contents of which is being incorporated herein by reference.

BACKGROUND

The present application relates to a display apparatus which includes a white light source.

Together with the progress of the semiconductor technology, a thin display apparatus called FPD (Flat Panel Display) has been developed and spread widely.

Various principles of light emission are applied to such thin display apparatus such as an organic EL (Electro Luminescence) display apparatus and a plasma display apparatus, and researches for such various thin display apparatus are proceeding.

Particularly, a liquid crystal display apparatus was placed into practical use earlier than display apparatus of the other types and has been popularized widely. Thus, a demand for an enhanced display characteristic (picture quality) of the liquid crystal display apparatus is increasing.

As regards a liquid crystal display apparatus, attention is paid particularly to the color reproduction performance among various display characteristics. The color reproduction performance enhances, that is, chromaticity points can be covered over a wider area, as light emission spectra corresponding to the colors of blue, green, and red are narrowed. However, as the light emission spectra are narrowed, the luminance decreases because the light emission center wavelength is displaced away from 555 nm at which the sensitivity of distinct vision is highest and the spectrum width is narrowed. In other words, the luminance and the color reproduction performance have a tradeoff relationship to each other.

In recent years, also a display apparatus has been proposed which is directed to increase of chromaticity points, which can be covered, in order to achieve a higher color reproduction performance. A display apparatus of the type described is disclosed, for example, in Japanese Patent Laid-open No. 2004-163902. However, enhancement of the color reproduction performance of a display apparatus involves decrease of the luminance as described above. Besides, in recent years, an apparatus configuration which can cover a particular chromaticity point with certainty is frequently demanded as a useful configuration rather than another apparatus configuration which simply increases chromaticity points which can be covered.

For example, the sRGB standards were established as international standards (IEC61966-2-1) in 1999. The sRGB standards are unified standards which reduce or eliminate differences in color reproduction performance among different types of apparatus such as display apparatus beginning with television sets, digital still cameras, printers, and mobile apparatus. The sRGB standards make image color information represented by a mobile apparatus and image color information represented by an inputting and outputting device coincide with each other to achieve unification (matching in color reproduction performance) of the color reproduction performance and the color space which differ extremely depending upon the maker or the model of the apparatus. However, it is considered difficult for a liquid crystal display apparatus, particularly a liquid crystal display apparatus in which a cold cathode fluorescent lamp (CCFL) is used as a backlight system, to assure a color reproduction performance which covers a particular chromaticity point prescribed in the sRGB standards, for example, a green chromaticity point of (0.300, 0.600).

At present, for fluorescent materials to be used for a liquid crystal display apparatus which includes a cold cathode fluorescent lamp as a backlight, BAM:Eu having a composition represented by a [Chemical formula 5] given below is available as a blue fluorescent material; LAP (lanthanum phosphate terbium) having a configuration represented by a [Chemical formula 6] given below is available as a green fluorescent material; and YO having a composition represented by a [Chemical formula 7] given below is available as a red fluorescent material:

$BaMgAl_{10}O_{17}:Eu$  [Chemical formula 5]

$LaPO_4:Ce, Tb$  [Chemical formula 6]

$Y_2O_3:Eu$  [Chemical formula 7]

A verification test of a green chromaticity point was conducted for three different liquid crystal display apparatus on the market which incorporate the fluorescent materials specified above. In FIG. 9, chromaticity points (ranges) which can be covered by the liquid crystal display apparatus are indicated by a solid line graph l, a broken line graph m, and a chain line graph n. As seen from the graphs l, m, and n, they are closest, for example, at chromaticity points (0.2786, 0.6053), (0.2632, 0.5985), and (0.2808, 0.5899) to the green chromaticity point prescribed by the sRGB standards. Therefore, it was confirmed that the particular chromaticity point is not covered.

Such a problem of a display apparatus as just described arises from a fact that, for example, when blue or red light enters a color filter of a pixel corresponding to green light, a green output chromaticity point is displaced in such a manner as to be dragged to the blue side or the red side. It is considered very difficult to solve this problem because light emission spectra of the fluorescent materials of red, green, and blue partly overlap with each other and the problem is complicated by a mutual relationship of the spectra with color filters which construct the display apparatus.

Accordingly, in order to achieve enhancement of the color reproduction performance while a sufficient luminance is maintained, it is considered particularly preferable to cover a particular chromaticity point, for example, the green chromaticity point prescribed by the sRGB standards, rather than to merely achieve increase of chromaticity points.

SUMMARY

Therefore, it is preferable to provide a display apparatus which has a color reproduction performance ready for a predetermined chromaticity point while a sufficient luminance is maintained.

According to an embodiment, a display apparatus includes a light source apparatus including a white light source, a blue fluorescent material, a green fluorescent material having a composition represented by the following [Chemical formula 8]:

$BaMgAl_{10}O_{17}:Eu, Mn$  [Chemical formula 8]

a red fluorescent material, a green color filter, and a red color filter, a green chromaticity point of an output of green light to be omitted from the green fluorescent material and a red chromaticity point of an output of red light to be emitted from the red fluorescent material on a chromaticity coordinate system being interconnected by an imaginary straight line which passes only points which are equal to or higher than (x=0.300, Y=0.600) with regard to at least one of an x-axis component and a y-axis component of the chromaticity coordinate system.

It is to be noted that, in each of the chemical formulae set forth in an embodiment of the present specification, a part preceding to ":" indicates the parent body, and the other part following ":" indicates the center of light emission. The concentration of the center of light emission is selected in accordance with an object optical characteristic such as the color reproduction performance or the luminance. However, according to the embodiment, the display apparatus can be configured using fluorescent materials having particularly preferable optical characteristics.

In the display apparatus, the green chromaticity point of the output of green light to be omitted from the green fluorescent material and the red chromaticity point of the output of red light to be emitted from the red fluorescent material on the chromaticity coordinate system are interconnected by the imaginary straight line which passes only those points which are equal to or higher than (0.300, 0.600) with regard to at least one of the x-axis component and the y-axis component of the chromaticity coordinate system. Therefore, with the display apparatus, a color reproduction performance which is ready for a particular chromaticity point can be achieved while a sufficient luminance is maintained.

Additional features and advantages are described herein, and will be apparent from, the following Detailed Description and the figures.

DETAILED DESCRIPTION

A display apparatus is provided in an embodiment which can cover the green chromaticity point of the sRGB standards and has a superior optical characteristic not only by selectively using fluorescent materials corresponding to the colors of red, green, and blue but also by defining the green chromaticity point regarding light emission of the green fluorescent material based on a relationship between the fluorescent materials and (the transmission characteristics of) color filters which compose the display apparatus.

More particularly, a display apparatus is provided in an embodiment which has a superior characteristic by configuring the display apparatus in the following manner. In particular, the display apparatus includes, as a green fluorescent material, a fluorescent material having a composition represented by the [Chemical expression 8] given hereinabove and having a main light emission wavelength of 515 nm. Further, the chromaticity point of the green fluorescent material is defined based on the spectrum shape of light emission (Blue PL) of the blue fluorescent material, the transmission spectrum shape of the green color filter (GCF), the transmission spectrum shape of the red color filter (RCF), and the white chromaticity of a white light source (CCFL).

In the following, a preferred embodiment is described with reference to the accompanying drawings.

Figure 1:
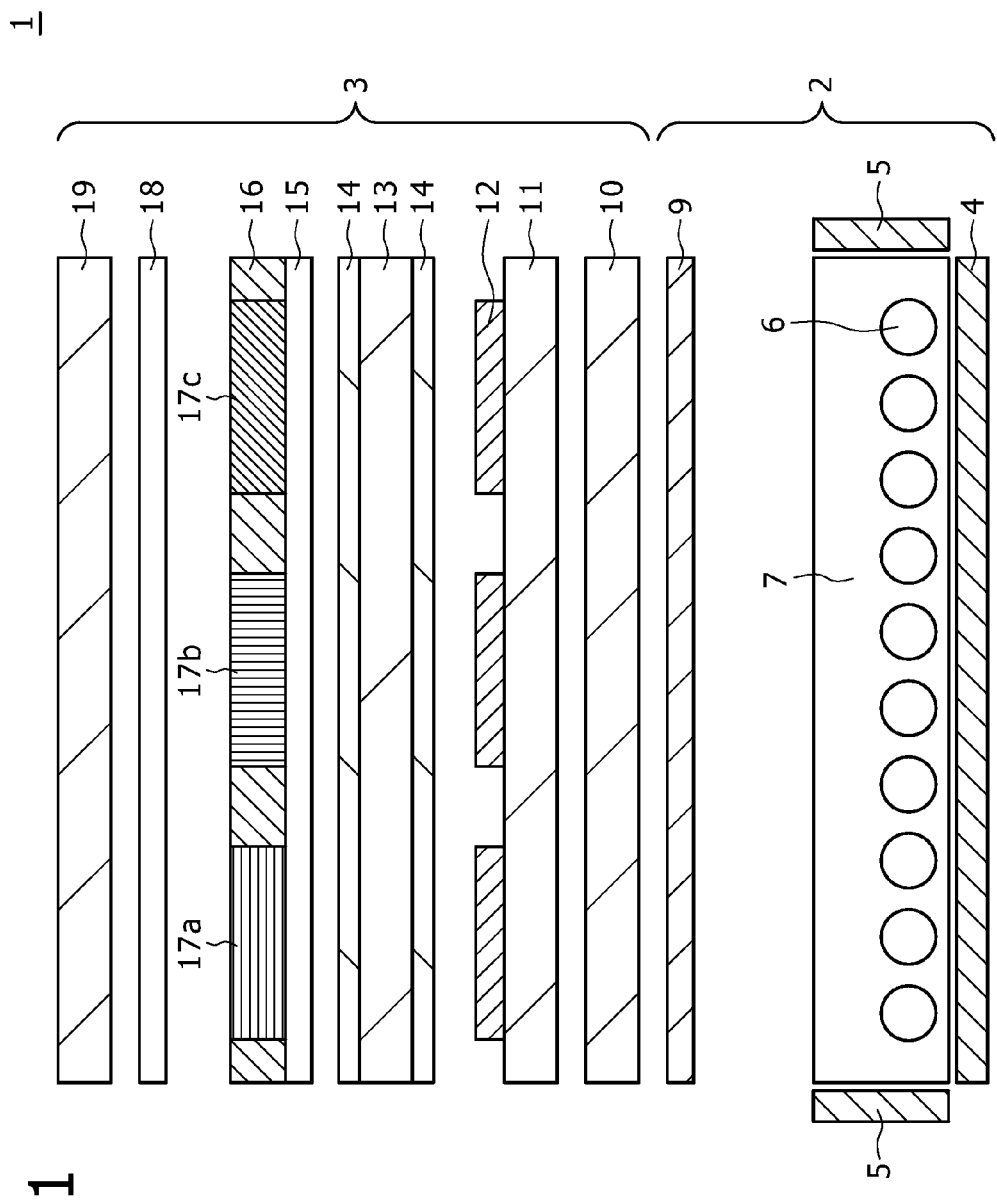
FIG. 1 is a schematic view showing a configuration of a display apparatus to which an embodiment is applied.

FIG. 1 shows a general configuration of a display apparatus to which an embodiment is applied and which includes a light source apparatus.

Referring to FIG. 1, the display apparatus 1 shown includes a light source apparatus 2 and an optical apparatus 3. The display apparatus 1 further includes a reflector 4 provided on the rear face side opposite to the front face side of the light source apparatus 2 which opposes to the optical apparatus 3.

The light source apparatus 2 includes a large number of white light sources 6 in the form of a CCFL. A first fluorescent material (for example, a red fluorescent material), a second fluorescent material (for example, a green fluorescent material), and a third fluorescent material (for example, a blue fluorescent material) are applied to the surface of the white light sources 6. The white chromaticity of the entire white light sources 6 is defined by selecting the composition and the amount (density) of the fluorescent materials.

In the embodiment, a diffusion sheet 9 is provided at a portion of the light source apparatus 2 which is positioned nearest to the optical apparatus 3. The diffusion sheet 9 introduces light from the white light sources 6 uniformly in a plane to the light source apparatus 2 side. As occasion demands, another reflector 5 similar to the reflector 4 is provided also on the side faces of a light guide section 7.

Meanwhile, the optical apparatus 3 includes a polarization plate 10, a glass substrate 11 for TFTs (Thin Film Transistors), and dot-shaped electrodes 12 provided on the surface of the glass substrate 11, a liquid crystal layer 13, and a pair of orientation films 14 adhered to the opposite faces of the liquid crystal layer 13. The optical apparatus 3 further includes an electrode 15, a plurality of black matrices 16 on the electrode 15, and a first (red) color filter 17*a*, a second (green) color filter 17*b*, and a third (blue) color filter 17*c* provided between the black matrices 16 and corresponding to pixels. The optical apparatus 3 further includes a glass substrate 18 provided in a spaced relationship from the black matrices 16 and the color filters 17*a* to 17*c*, and another polarization plate 19. The components mentioned of the optical apparatus 3 are disposed in order from the side near to the light source apparatus 2.

The polarization plates 10 and 19 form light which is oscillated in a particular direction. Further, the glass substrate 11, the dot-shaped electrodes 12 and electrode 15 are provided to switch the liquid crystal layer 13 which transmits only light which oscillates in the particular direction. Since the glass substrate 11 and the dot-shaped electrodes 12 and electrode 15 are provided together with the orientation films 14, the inclinations of liquid crystal molecules in the liquid crystal layer 13 are adjusted to a fixed direction. Further, since the black matrices 16 are provided, enhancement of the contrast of light outputted from the color filters 17*a* to 17*c* corresponding to the individual colors is achieved. The black matrices 16 and color filters 17*a* to 17*c* are attached to the glass substrate 18.

In the present embodiment, the first fluorescent material is formed from a red fluorescent material having a composition represented by any of the [Chemical formula 9] to [Chemical formula 11] given below. In order to obtain light emission in a red region, preferably the light emission wavelength band of the first fluorescent material includes at least part of 610 nm to 670 nm.

$$Y_2O_3\text{:Eu} \quad \text{[Chemical formula 9]}$$

$$YVO_4\text{:Eu} \quad \text{[Chemical formula 10]}$$

$$Y(V, P)O_4\text{:Eu} \quad \text{[Chemical formula 11]}$$

It is to be noted that V and P in the [Chemical formula 11] may be replaced at an arbitrary ratio in response to the characteristics. In the following description, it is described that the red fluorescent material having the composition represented by the [Chemical formula 10] is used as an example.

Meanwhile, in the present embodiment, the second fluorescent material is formed from a green fluorescent material having a composition represented by the [Chemical formula 8] given hereinabove. In order to obtain light emission of a green region, preferably the light emission wavelength band of the second fluorescent material includes at least part of 510 nm to 550 nm.

Further, in the present embodiment, the third fluorescent material is formed from a blue fluorescent material having a composition represented by the [Chemical formula 12] given hereinbelow. In order to obtain light emission of a blue region, preferably the light emission wavelength band of the third fluorescent material includes at least part of 450 nm to 460 nm.

Figure 2:
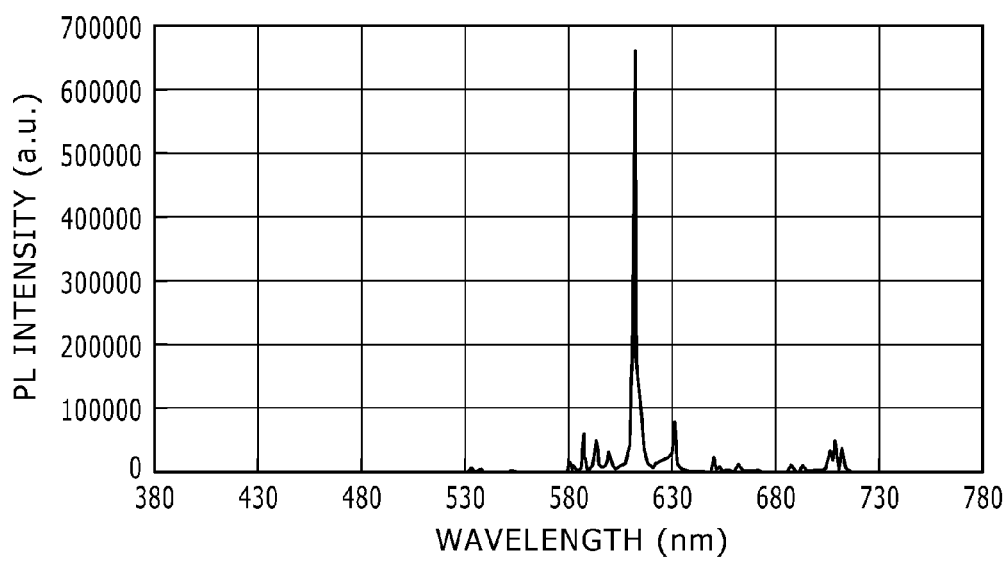
FIGS. 2, 3, 4, and 5 are diagrams illustrating different examples of a fluorescent material used in the display apparatus of FIG. 1.
Figure 3:
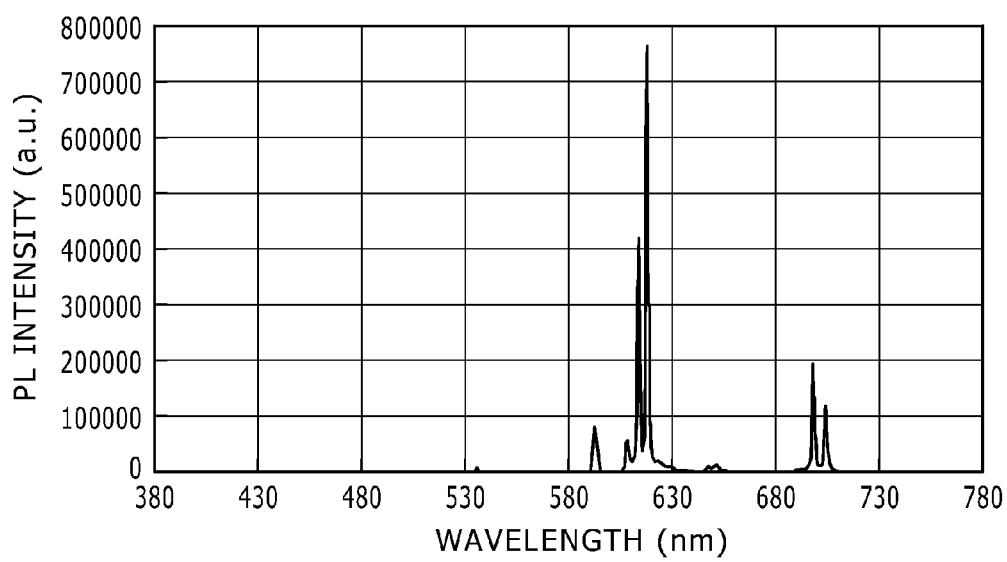

Light emission spectra of a fluorescent material having a composition represented by the [Chemical formula 9] and another fluorescent material having a composition represented by the [Chemical formula 10], which can be used as a red fluorescent material which forms a display apparatus according to the embodiment, are shown in FIGS. 2 and 3, respectively. It is to be noted that the fluorescent material having a composition represented by the [Chemical formula 11] is not shown in the drawings because it exhibits a light emission spectrum substantially similar to that of the fluorescent material having the composition represented by the [Chemical formula 10] even if the ratio between V and P is varied.

Figure 4:
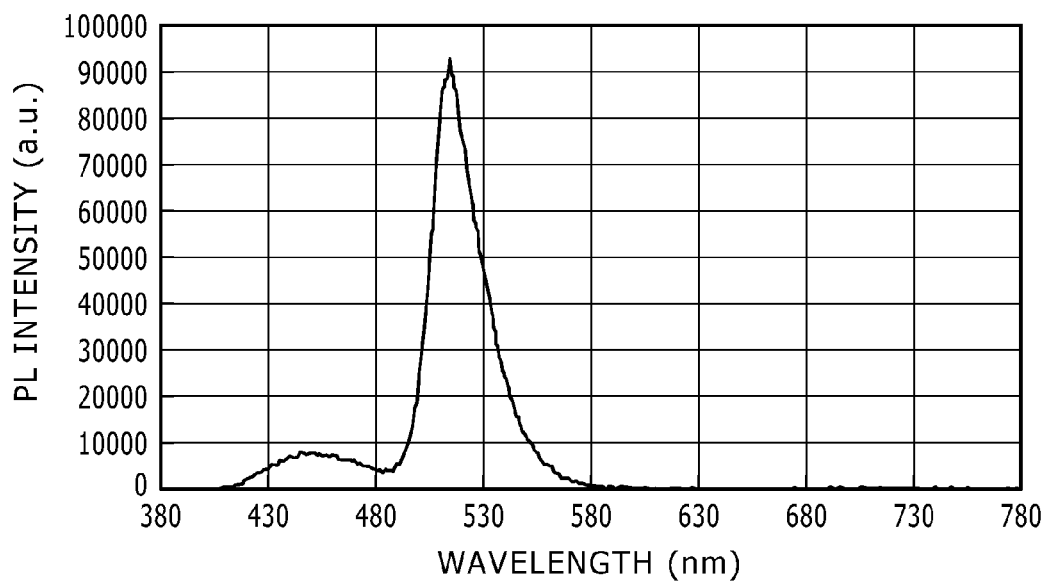
Figure 5:
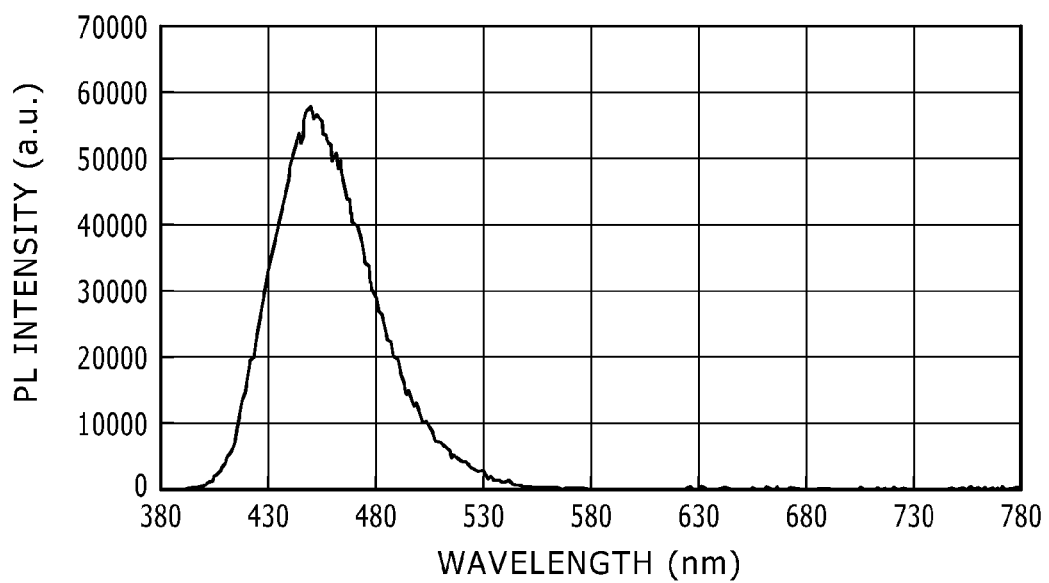

Meanwhile, light emission spectra of a fluorescent material which has a composition represented by the [Chemical formula 8] which can be used as a green fluorescent material which forms the display apparatus according to the embodiment and a fluorescent material which has a composition represented by the [Chemical formula 12] and can be used as a blue fluorescent material which forms the display apparatus according to the embodiment are shown in FIGS. 4 and 5, respectively. It is to be noted that, although the light emission spectra of FIG. 5 exhibit locations in the proximity of 450 nm and 515 nm at which the light emission intensity is high. Such locations are selected in response to the concentration or the synthesis of $Eu^{2+}$ and $Mn_2^+$ solid-solved in the fluorescent material, and an example considered representative is illustrated in FIG. 5.

$$BaMgAl_{10}O_{17}\text{:Eu} \quad \text{[Chemical formula 12]}$$

In the display apparatus according to the embodiment having such a configuration as described above, the light emission spectrum shape of the blue fluorescent material, the transmission spectrum shape of a green color filter, the transmission spectrum shape of a red color filter, and the white chromaticity of the white light sources (CCFLs) are varied among a plurality of stages to perform a simulation to obtain green chromaticity points (as a parameter [variable]). The relationship among the green chromaticity points is detected as hereinafter described. Based on a result of the simulation, a display apparatus having specifically superior optical characteristics (which can cope also with the sRGB standards mentioned hereinabove) can be configured.

It is to be noted that, in the display apparatus 1 according to the present embodiment, since green light and red light are obtained from fluorescent materials in the light source apparatus 2, deterioration of optical characteristics by a temperature rise can be prevented without allowing temperature quenching to occur by heat generation of a light source itself for green or red, different from an alternative case that lights of the individual colors are obtained, for example, from LEDs (Light Emitting Diodes). Further, since complicated specifications as necessary for using a control circuit or a correction circuit are not necessary, a simplified apparatus configuration can be used.

WORKING EXAMPLES

Now, a result of an investigation carried out through simulations regarding the configuration of a display apparatus as a working example of the display apparatus according to the embodiment is described.

In the investigation, a green chromaticity point regarding output light of the entire display apparatus is defined by mixture of blue light from the third fluorescent material into the second color filter 17b provided for a pixel corresponding to green, similar mixture of red light from the first fluorescent material into the second color filter 17b, and the light emission spectrum of the green fluorescent material of the second fluorescent material. Then, a red chromaticity point of output light as the entire display apparatus is defined by mixture of green light from the second fluorescent material into the first color filter 17a provided for a pixel corresponding to red and the light emission spectrum of the red fluorescent material of the first fluorescent material.

An investigation has been made in order to select an apparatus configuration by which the green fluorescent material and the red fluorescent material obtained in this manner are interconnected by an imaginary straight line which passes only those points at which at least one of an x-axis component and a y-axis component ($x=0.300$, $y=0.600$) of a chromaticity coordinate system (x, y chromaticity coordinate system)

In particular, the four factors including the light emission spectrum shape of the blue fluorescent material, the transmission spectrum shape of the green color filter, the transmission spectrum shape of the red color filter, and the white chromaticity of the white light sources (CCFLs) were varied among a plurality of stages to perform simulations to obtain green chromaticity points (as a parameter [variable]) and detect a relationship among the green chromaticity points. Based on a result of the simulations, an apparatus configuration having specifically superior optical characteristics (which can cope also with the sRGB standards mentioned hereinabove) was investigated.

Figure 6:
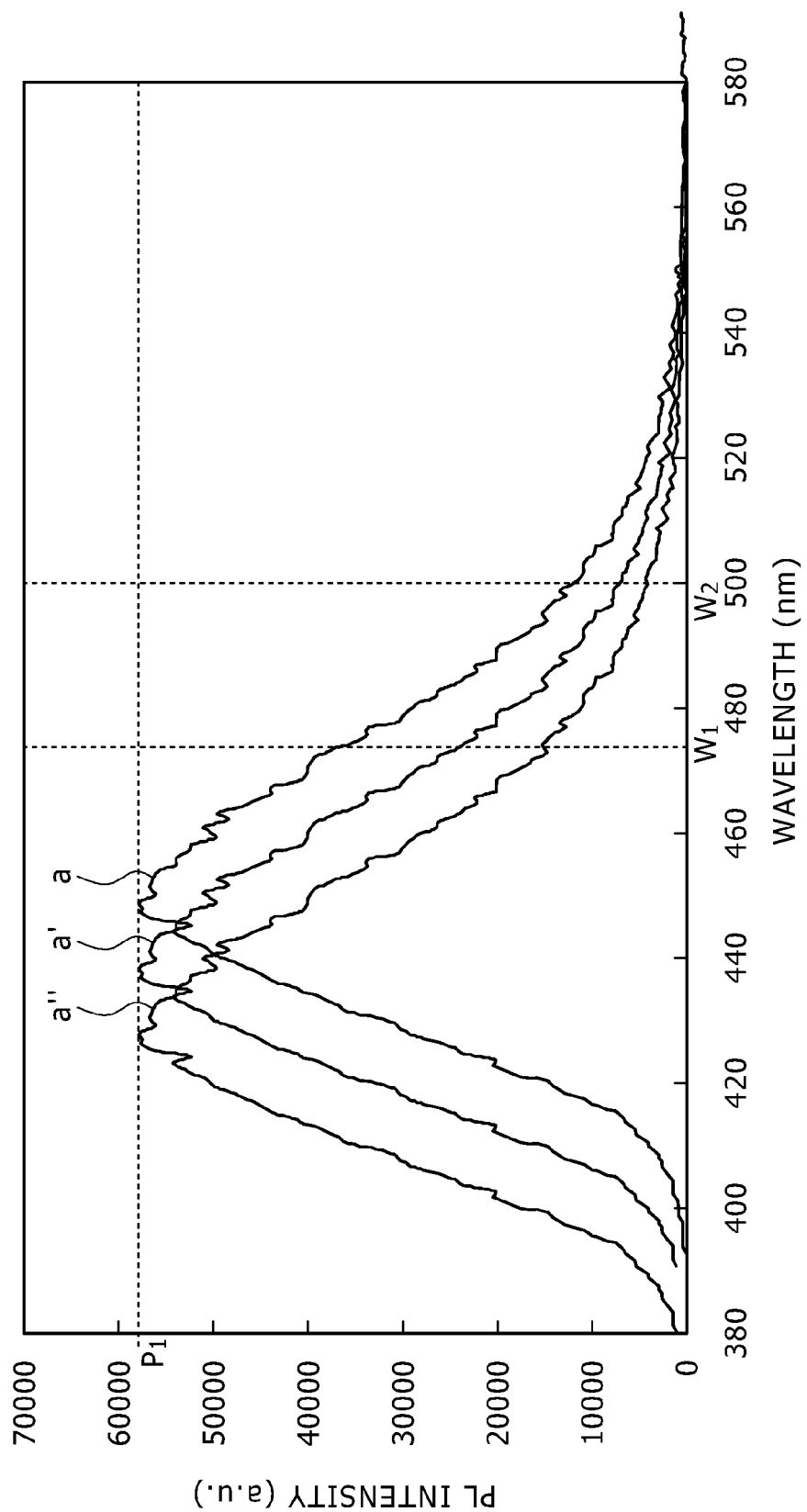
FIGS. 6, 7, and 8 are diagrams illustrating variations of light emission spectra of the fluorescent materials used in the display apparatus of FIG. 1.

Here, the light emission spectrum of the blue fluorescent material was varied among eight different stages to perform the simulations. In particular, the light emission spectrum of the blue fluorescent material as a reference was set, and the composition ratio of the fluorescent material was varied to successively shift the light emission spectrum by 3 nm to the low wavelength side. Corresponding spectra are shown in FIG. 6. Referring to FIG. 6, the wavelength difference between the spectrum (a in FIG. 6) before the shifting and the spectrum (a" in FIG. 6) after the shifting is 21 nm. It is to be noted that, as an example obtained by stepwise variation, an intermediate spectrum (a' in FIG. 6) is shown in FIG. 6.

In the investigation, the spectrum was shifted stepwise from the spectrum (a in FIG. 6) before the shifting toward the shorter wavelength side. Then, with regard to each of the spectra, the light emission intensity (PL intensity), for example, at 475 nm ($W_1$ in FIG. 6) and 500 nm ($W_2$ in FIG. 6) in a wavelength band on the comparatively longer wavelength side which influences on the chromaticity of green was obtained as a ratio to the maximum light emission intensity ($P_1$ in FIG. 6) of the spectrum, and it was examined whether or not the ratio has a value suitable for formation of the chromaticity of green.

Figure 7:
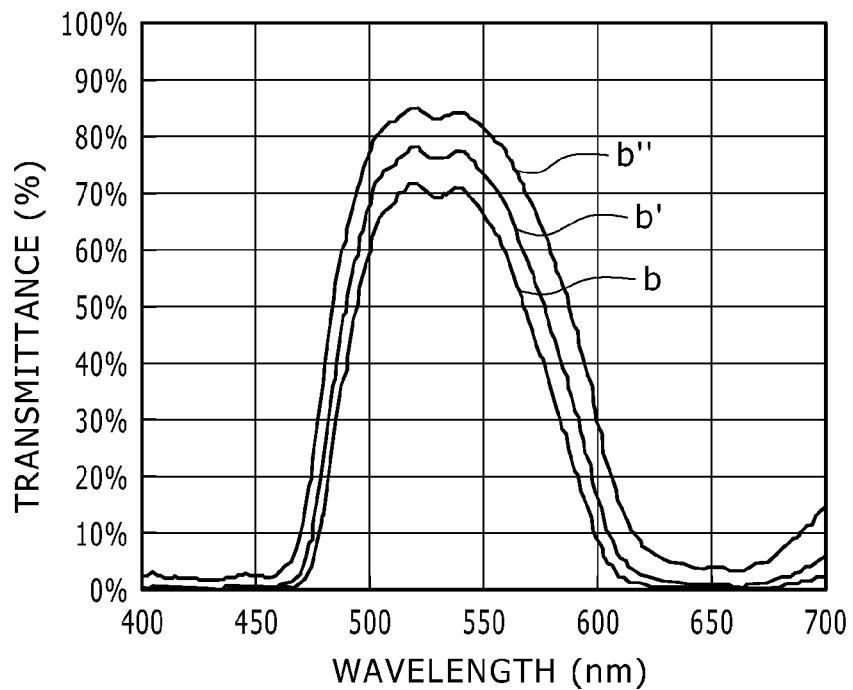
Figure 8:
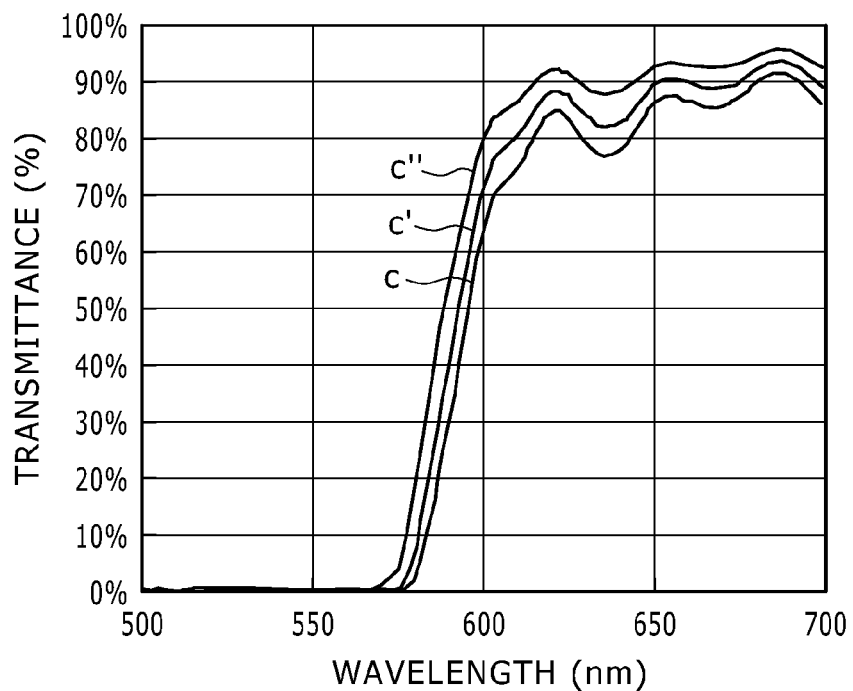

Further, in the simulations, the transmission spectrum of the first color filter and the second color filter was varied among three stages. In particular, a film thickness of the green color filter to be used as a reference was set, and the film thickness was varied with a predetermined value to determine a corresponding light emission spectrum. It is to be noted that the variation of the transmission spectrum by variation of the film thickness can be estimated based on the Lambert-Beer law. The transmission spectra (b to b") of the second color filter from between the color filters used for the measurement are illustrated in FIG. 7, and the transmission spectra (c to c") of the first color filter are illustrated in FIG. 8.

Since the light emitted from the white light sources exhibits the white color by mixture of lights from the fluorescent materials of blue, red, and green, also the white chromaticity varies by variation of the compounding ratio among the colors and the variation of the fluorescent material, and consequently, also the light emission spectra of the colors and the chromaticity points vary. Accordingly, in the working examples described below, the measurement was conducted setting the white chromaticity as a parameter as hereinafter described.

It is to be noted that, in the working examples described below, the range of or the distance between the parameters is not fixed, and also the measurement of optical characteristics was carried out only with regard to a central value within each numerical range. It is considered that the ranges and the distances are sufficiently small in grasping of a trend of an optical characteristic of the display apparatus and, within each range, the optical characteristic exhibits a trend substantially similar to that of a central value within the range.

It is to be noted that, in the working examples described below, when a display apparatus was to be produced, the fluorescent lamps were produced in the following manner. In particular, fluorescent materials of the three colors were mixed into solution produced by dissolving nitrocellulose into organic solvent to prepare suspension. Then, the suspension was poured into and dried with a glass tube, and then excitation gas (silver or rare gas) was encapsulated into the glass tube and electrodes were attached to the glass tube.

First Working Example

A result of an investigation carried out with regard to a configuration according to a first working example which used a fluorescent material having a composition represented by the [Chemical formula 8] given hereinabove as a green fluorescent material and another fluorescent material having a composition represented by the [Chemical formula 9] given hereinabove as a red fluorescent material is described.

In the present working example, the light emission spectrum of the CCFL was varied within a range of $0.2405 \leq x \leq 0.2830$ or another range of $0.1802 \leq y \leq 0.2600$. Further, each of the ranges mentioned was divided into four smaller regions of ($0.2405 \leq x < 0.2468$, $0.1802 \leq y < 0.2148$), ($0.2468 \leq x < 0.2588$, $0.2148 \leq y < 0.2292$), ($0.2588 \leq x < 0.2705$, $0.2292 \leq y < 0.2420$), and ($0.2705 \leq x < 0.2830$, $0.2420 \leq y < 0.2600$). Then, the compounding ratio of R, G, and B was varied through calculation to perform calculation of the chromaticity hereinafter described so that the chromaticity may be provided at the chromaticity point at the center of each of the ranges. The thus calculated chromaticity point was determined as the chromaticity point within the range.

It is to be noted that, in the present working example, the shape of the transmission spectrum of the green color filter was defined by the transmission factors at the three points of the wavelengths of 475 nm, 525 nm, and 600 nm. The shape of the transmission spectrum of the red color filter was defined by the transmission factors at the two points of 580 nm and 600 nm. In particular, the spectrum shape of the green color filter was varied such that the transmission factor of the red color filter might be 3 to 18% at 475 nm, 67 to 83% at 525 nm, and 7 to 30% at 600 nm. Further, the spectrum shape of the red color filter was varied such that the transmission factor of the red color filter might be 8 to 32% at 580 nm and 62 to 81% at 600 nm.

Meanwhile, the shape of the blue light emission spectrum was defined by the light emission intensities at the two points of the wavelength. The maximum value of the light emission intensity of the blue fluorescent material was defined as one, and the light emission intensity at the two points of the wavelength was indicated. Further, since the blue light emission spectrum which influences on the chromaticity has an influence on output light whose shape on the longer wavelength side corresponds to those of green and red, the spectrum shape on the longer wavelength side was defined. In particular, the spectrum shape was varied such that the light emission intensity at 475 nm ranged from 0.20 to 0.56 and the light emission intensity at 500 nm ranged from 0.05 to 0.170.

Calculation of the chromaticity is performed, for example, in the case of a display apparatus of the liquid crystal display type, by a method of multiplying basic color information obtained by (light emission spectrum of fluorescent material)×(transmission spectrum of color filter) by a color matching function.

In particular, the white light emission spectrum of the CCFL set as described above and the transmission spectrum of the green color filter are multiplied, and a chromaticity point was calculated from the color matching function. The color matching function provides values determined by an experiment and indicates how much a person feels a stimulus of red, green, and blue for each wavelength of the colors. The color matching function is composed of three functions of an $x(\lambda)$ function, a $y(\lambda)$ function, and a $z(\lambda)$ function. The $x(\lambda)$ function indicates the degree by which a person feels light of each wavelength reddish, and the $y(\lambda)$ and $z(\lambda)$ functions represent the degree by which a person feels light of each wavelength bluish or greenish, respectively. Particular calculation expressions are given as [Expression 1] to [Expression 5] below:

$X = k\int vis\phi(\lambda) \cdot x_0(\lambda) d\lambda$ [Expression 1]

$X = k\int vis\phi(\lambda) \cdot y_0(\lambda) d\lambda$ [Expression 2]

$X = k\int vis\phi(\lambda) \cdot z_0(\lambda) d\lambda$ [Expression 3]

$x = X/(X+Y+Z)$ [Expression 4]

$y = Y/(X+Y+Z)$ [Expression 5]

Figure 9:
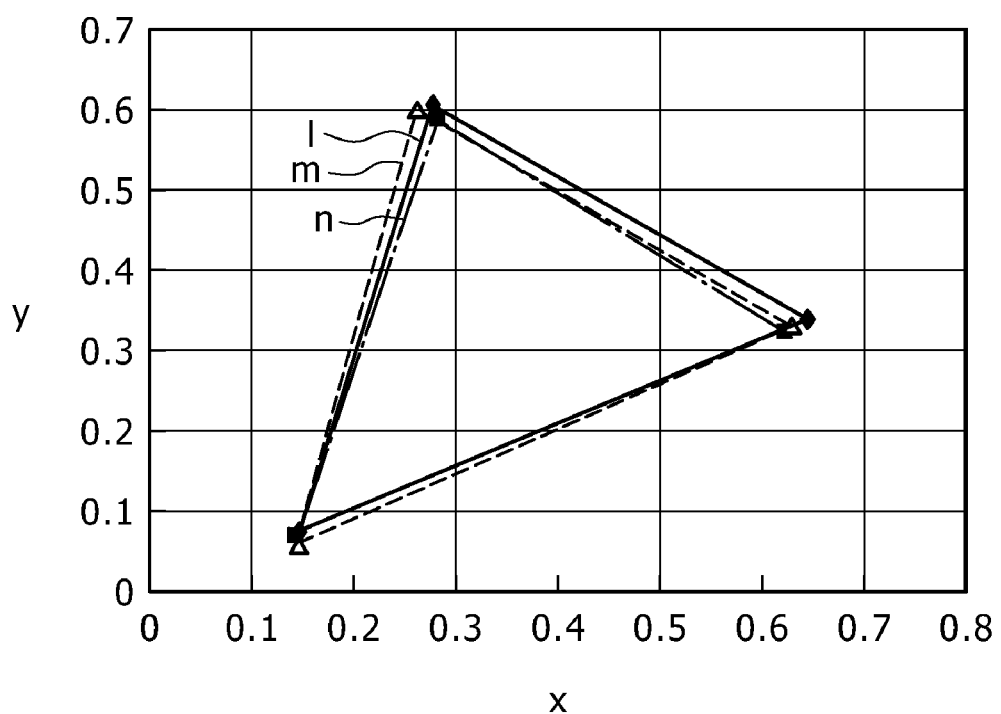
FIG. 9 is a diagram illustrating a chromaticity coordinate system.

By the method described, the chromaticity points ($x_R$, $y_R$) and ($x_G$, $y_G$) were calculated regarding red and green, and it was examined whether or not an imaginary straight line interconnecting the chromaticity points ($x_R$, $y_R$) and ($x_G$, $y_G$)

passes only those points which are equal to or higher than (0.300, 0.600) with regard to at least one of an x-axis component and a y-axis component of the chromaticity coordinate system (coordinate system shown in FIG. 9). Such results as given in the following tables were obtained from the examinations. In the tables, ○ represents an apparatus configuration that the imaginary straight line passes only those points which are equal to or higher than (0.300, 0.600) with regard to at least one of the x-axis component and the y-axis component of the chromaticity coordinate system. On the other hand, x represents another apparatus configuration that the imaginary straight line passes also a point other than those points which are equal to or higher than (0.300, 0.600) with regard to at least one of the x-axis component and the y-axis component of the chromaticity coordinate system. In other words, the imaginary straight line passes a point lower than (0.300, 0.600) with regard to both of the x-axis component and the y-axis component.

TABLE 1

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | x | x | ○ | ○ |
| 0.25 | 0.067 | x | x | ○ | ○ | ○ | ○ | ○ |
| 0.20 | 0.050 | x | x | ○ | ○ | ○ | ○ | ○ |
| | 475 nm 500 nm Blue PL | | | | | | | |

TABLE 2

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | x | x | ○ | ○ |
| 0.25 | 0.067 | x | x | ○ | ○ | ○ | ○ | ○ |
| 0.20 | 0.050 | x | x | ○ | ○ | ○ | ○ | ○ |
| | 475 nm 500 nm Blue PL | | | | | | | |

TABLE 3

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | x | x | ○ | ○ |
| 0.25 | 0.067 | x | x | ○ | ○ | ○ | ○ | ○ |
| 0.20 | 0.050 | x | x | ○ | ○ | ○ | ○ | ○ |
| | 475 nm 500 nm Blue PL | | | | | | | |

TABLE 4

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | x | x | ○ | ○ |
| 0.25 | 0.067 | x | x | ○ | ○ | ○ | ○ | ○ |
| 0.20 | 0.050 | x | x | ○ | ○ | ○ | ○ | ○ |
| | 475 nm 500 nm Blue PL | | | | | | | |

TABLE 5

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | x | x | ○ | ○ |
| 0.25 | 0.067 | x | x | ○ | ○ | ○ | ○ | ○ |
| 0.20 | 0.050 | x | x | ○ | ○ | ○ | ○ | ○ |
| | 475 nm 525 nm Blue PL | | | | | | | |

TABLE 6

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | x | x | ○ | ○ |
| 0.25 | 0.067 | x | x | ○ | ○ | ○ | ○ | ○ |
| 0.20 | 0.050 | x | x | ○ | ○ | ○ | ○ | ○ |
| | 475 nm 500 nm Blue PL | | | | | | | |

TABLE 7

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | x | x | ○ | ○ |
| 0.25 | 0.067 | x | x | ○ | ○ | ○ | ○ | ○ |
| 0.20 | 0.050 | x | x | ○ | ○ | ○ | ○ | ○ |
| | 475 nm 500 nm Blue PL | | | | | | | |

TABLE 8

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | x | x | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm Blue PL | 500 nm | | | | | | | |

TABLE 9

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | x | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm Blue PL | 500 nm | | | | | | | |

TABLE 10

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | x | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm Blue PL | 500 nm | | | | | | | |

TABLE 11

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | x | ○ | ○ | ○ |
| 0.25 | 0.067 | x | x | x | ○ | ○ | ○ | ○ |
| 0.20 | 0.050 | x | x | ○ | ○ | ○ | ○ | ○ |
| 475 nm Blue PL | 500 nm | | | | | | | |

TABLE 12

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm Blue PL | 500 nm | | | | | | | |

TABLE 13

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm Blue PL | 500 nm | | | | | | | |

TABLE 14

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm Blue PL | 500 nm | | | | | | | |

TABLE 15

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | x | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm Blue PL | 500 nm | | | | | | | |

TABLE 16

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | x | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm Blue PL | 500 nm | | | | | | | |

TABLE 17

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | x | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm Blue PL | 500 nm | | | | | | | |

TABLE 18

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | x | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm Blue PL | 500 nm | | | | | | | |

TABLE 19

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | x | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm Blue PL | 500 nm | | | | | | | |

TABLE 20

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | ○ | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm Blue PL | 500 nm | | | | | | | |

TABLE 21

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | ○ | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm Blue PL | 500 nm | | | | | | | |

TABLE 22

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | ○ | ○ |
| 0.48 | 0.135 | x | x | x | x | ○ | ○ | ○ |
| 0.41 | 0.118 | x | x | x | x | ○ | ○ | ○ |
| 0.35 | 0.101 | x | x | x | ○ | ○ | ○ | ○ |
| 0.30 | 0.084 | x | x | ○ | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm Blue PL | 500 nm | | | | | | | |

TABLE 23

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | ○ | ○ |
| 0.48 | 0.135 | x | x | x | x | ○ | ○ | ○ |
| 0.41 | 0.118 | x | x | x | x | ○ | ○ | ○ |
| 0.35 | 0.101 | x | x | x | ○ | ○ | ○ | ○ |
| 0.30 | 0.084 | x | x | ○ | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm Blue PL | 500 nm | | | | | | | |

TABLE 24

| GCF | 475 nm 525 nm 600 nm Blue PL | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | o |
| 0.51 | 0.157 | x | x | x | x | x | o | o |
| 0.48 | 0.135 | x | x | x | x | x | o | o |
| 0.41 | 0.118 | x | x | x | x | o | o | o |
| 0.35 | 0.101 | x | x | x | o | o | o | o |
| 0.30 | 0.084 | x | x | o | o | o | o | o |
| 0.25 | 0.067 | x | x | o | o | o | o | o |
| 0.20 | 0.050 | x | x | o | o | o | o | o |

TABLE 25

| GCF | 475 nm 525 nm 600 nm Blue PL | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | o |
| 0.51 | 0.157 | x | x | x | x | x | o | o |
| 0.48 | 0.135 | x | x | x | x | x | o | o |
| 0.41 | 0.118 | x | x | x | x | o | o | o |
| 0.35 | 0.101 | x | x | x | o | o | o | o |
| 0.30 | 0.084 | x | x | o | o | o | o | o |
| 0.25 | 0.067 | x | x | o | o | o | o | o |
| 0.20 | 0.050 | x | o | o | o | o | o | o |

TABLE 26

| GCF | 475 nm 525 nm 600 nm Blue PL | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | o |
| 0.51 | 0.157 | x | x | x | x | x | o | o |
| 0.48 | 0.135 | x | x | x | x | x | o | o |
| 0.41 | 0.118 | x | x | x | o | o | o | o |
| 0.35 | 0.101 | x | x | x | o | o | o | o |
| 0.30 | 0.084 | x | x | o | o | o | o | o |
| 0.25 | 0.067 | x | x | o | o | o | o | o |
| 0.20 | 0.050 | x | o | o | o | o | o | o |

TABLE 27

| GCF | 475 nm 525 nm 600 nm Blue PL | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | o |
| 0.51 | 0.157 | x | x | x | x | x | o | o |
| 0.48 | 0.135 | x | x | x | x | x | o | o |
| 0.41 | 0.118 | x | x | x | x | o | o | o |
| 0.35 | 0.101 | x | x | x | o | o | o | o |
| 0.30 | 0.084 | x | x | o | o | o | o | o |
| 0.25 | 0.067 | x | x | o | o | o | o | o |
| 0.20 | 0.050 | x | o | o | o | o | o | o |

TABLE 28

| GCF | 475 nm 525 nm 600 nm Blue PL | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | o |
| 0.51 | 0.157 | x | x | x | x | x | o | o |
| 0.48 | 0.135 | x | x | x | x | x | o | o |
| 0.41 | 0.118 | x | x | x | o | o | o | o |
| 0.35 | 0.101 | x | x | x | o | o | o | o |
| 0.30 | 0.084 | x | x | o | o | o | o | o |
| 0.25 | 0.067 | x | x | o | o | o | o | o |
| 0.20 | 0.050 | x | o | o | o | o | o | o |

It is to be noted that the simulations of [Table 1], [Table 8], [Table 15], and [Table 22] were carried out while the transmission factor of the red color filter ranged from 27% to 32% at the wavelength of 580 nm and from 78% to 81% at the wavelength of 600 nm.

Meanwhile, the simulations of [Table 2], [Table 9], [Table 16], and [Table 23] were carried out while the transmission factor of the red color filter ranged from 22% to 27% at the wavelength of 580 nm and from 75% to 78% at the wavelength of 600 nm.

The simulations of [Table 3], [Table 10], [Table 17], and [Table 24] were carried out while the transmission factor of the red color filter ranged from 18% to 22% at the wavelength of 580 nm and from 72% to 75% at the wavelength of 600 nm.

The simulations of [Table 4], [Table 11], [Table 18], and [Table 25] were carried out while the transmission factor of the red color filter ranged from 15% to 18% at the wavelength of 580 nm and from 69% to 72% at the wavelength of 600 nm.

The simulations of [Table 5], [Table 12], [Table 19], and [Table 26] were carried out while the transmission factor of the red Color filter ranged from 13% to 15% at the wavelength of 580 nm and from 66% to 69% at the wavelength of 600 nm.

The simulations of [Table 6], [Table 13], [Table 20], and [Table 27] were carried out while the transmission factor of the red color filter ranged from 10% to 13% at the wavelength of 580 nm and from 64% to 66% at the wavelength of 600 nm.

The simulations of [Table 7], [Table 14], [Table 21], and [Table 28] were carried out while the transmission factor of the red color filter ranged from 8% to 10% at the wavelength of 580 nm and from 62% to 64% at the wavelength of 600 nm.

On the other hand, as regards the white chromaticity of the white light sources, the ranges of ($0.2405 \leq x < 0.2468$, $0.1802 \leq y < 0.2148$) were used for [Table 1] to [Table 7]; the ranges of ($0.2468 \leq x < 0.2588$, $0.2148 \leq y < 0.2292$) were used for [Table 8] to [Table 14]; the ranges of ($0.2588 \leq x < 0.2705$, $0.2292 \leq y < 0.2420$) were used for [Table 15] to [Table 21]; and the ranges of ($0.2705 \leq x < 0.2830$, $0.2420 \leq y < 0.2600$) were used for [Table 22] to [Table 28]. Then, the central chromaticity within each chromaticity range was used for the simulation.

From the results given above, it is possible to calculate the chromaticity points $(x_R, y_R)$ and $(x_G, y_G)$ regarding red and green and select an apparatus configuration. The imaginary straight line interconnecting the chromaticity points $(x_R, y_R)$ and $(x_G, y_G)$ passes only those points which are equal to or higher than (0.300, 0.600) with regard to at least one of the x-axis component and the y-axis component of the chromaticity coordinate system.

It is to be noted that, although all of the apparatus configurations denoted by ○ in the tables above are considered preferable, particularly preferable configurations have a white chromaticity within the ranges of (0.2405≦x<0.2468, 0.1802≦y<0.2148). This is because the ranges are particularly preferable to the white chromaticity of the sole CCFL.

First, it was confirmed successfully that it is possible to obtain light corresponding to the particular green chromaticity point if the apparatus configuration is at least such as follows. In particular, the white chromaticity of the white light sources is (0.2405≦x<0.2468, 0.1802≦y<0.2148) on the chromaticity coordinate system; the transmission factor of the green color filter is equal to or higher than 3% but equal to or lower than 11% at the wavelength of 475 nm, equal to or higher than 67% but equal to or lower than 80% at the wavelength of 525 nm, and equal to or higher than 7% but equal to or lower than 22% at the wavelength of 600 nm; the transmission factor of the red color filter is equal to or higher than 8% but equal to or lower than 32% at the wavelength of 580 nm and equal to or higher than 62% but equal to or lower than 81% at the wavelength of 600 nm; and the light emission intensity of the blue fluorescent material is equal to or higher than 20% but equal to or lower than 30% at the wavelength of 475 nm and equal to or higher than 5% but equal to or lower than 8.4% at the wavelength of 500 nm with respect to the maximum light emission intensity of the blue fluorescent material.

Further, it was confirmed successfully that it is possible to obtain light corresponding to the particular green chromaticity point if the apparatus configuration is at least such as follows. In particular, the white chromaticity of the white light sources is (0.2405≦x<0.2468, 0.1802≦y<0.2148) on the chromaticity coordinate system; the transmission factor of the green color filter is equal to or higher than 3% but equal to or lower than 5.5% at the wavelength of 475 nm and equal to or higher than 67% but equal to or lower than 73% at the wavelength of 525 nm and besides equal to or higher than 7% but equal to or lower than 11% at the wavelength of 600 nm; the transmission factor of the red color filter is equal to or higher than 8% but equal to or lower than 32% at the wavelength of 580 nm and equal to or higher than 62% but equal to or lower than 81% at the wavelength of 600 nm; and the light emission intensity of the blue fluorescent material is equal to or higher than 20% but equal to or lower than 41% at the wavelength of 475 nm and equal to or higher than 5% but equal to or lower than 11.8% at the wavelength of 500 nm with respect to the maximum light emission intensity of the blue fluorescent material.

Furthermore, it was confirmed successfully that it is possible to obtain light corresponding to the particular green chromaticity point if the apparatus configuration is at least such as follows. In particular, the white chromaticity of the white light sources is (0.2405≦x<0.2468, 0.1802≦y<0.2148) on the chromaticity coordinate system; the transmission factor of the green color filter is equal to or higher than 3% but equal to or lower than 4% at the wavelength of 475 nm and equal to or higher than 67% but equal to or lower than 70% at the wavelength of 525 nm and besides equal to or higher than 7% but equal to or lower than 9% at the wavelength of 600 nm; the transmission factor of the red color filter is equal to or higher than 8% but equal to or lower than 32% at the wavelength of 580 nm and equal to or higher than 62% but equal to or lower than 81% at the wavelength of 600 nm; and the light emission intensity of the blue fluorescent material is equal to or higher than 20% but equal to or lower than 51% at the wavelength of 475 nm and equal to or higher than 5% but equal to or lower than 15.2% at the wavelength of 500 nm with respect to the maximum light emission intensity of the blue fluorescent material.

Second Working Example

A result of investigations carried out with regard to a configuration according to a second working example of the present application which used a fluorescent material having a composition represented by the [Chemical formula 8] given hereinabove as a green fluorescent material and another fluorescent material having a composition represented by the [Chemical formula 10] given hereinabove as a red fluorescent material is described.

In the present working example, the light emission spectrum of the CCFL was varied within a range of 0.2304≦x≦0.2892 or another range of 0.1805≦y≦0.2699. Further, each of the ranges mentioned was divided into four smaller regions of (0.2304≦x<0.2522, 0.1805≦y<0.2143), (0.2522≦x<0.2603, 0.2143≦y<0.2457), (0.2603≦x<0.2727, 0.2357≦y<0.2548), and (0.2705≦x<0.2830, 0.2548≦y<0.2699). Then, the compounding ratio of R, G, and B was varied through calculation to perform calculation so that the chromaticity may be provided at the chromaticity point at the center of each of the ranges. The thus calculated chromaticity point was determined as the chromaticity point within the range.

It is to be noted that, in the present working example, the variation of the shape of the transmission spectrum of the green color filter and the variation of the shape of the blue light emission spectrum are similar to those in the first working example.

Chromaticity calculation was carried out in a similar manner as in the first working example, and the chromaticity points $(x_R, y_R)$ and $(x_G, y_G)$ were calculated regarding red and green. Then, it was examined whether or not an imaginary straight line interconnecting the chromaticity points $(x_R, y_R)$ and $(x_G, y_G)$ passes only those points which are equal to or higher than (0.300, 0.600) with regard to at least one of an x-axis component and a y-axis component of the chromaticity coordinate system. Such results as given in the following tables were obtained from the examinations. In the tables, ○ represents an apparatus configuration that the imaginary straight line passes only those points which are equal to or higher than (0.300, 0.600) with regard to at least one of the x-axis component and the y-axis component of the chromaticity coordinate system. On the other hand, x represents another apparatus configuration that the imaginary straight line passes also a point other than those points which are equal to or higher than (0.300, 0.600) with regard to at least one of the x-axis component and the y-axis component of the chromaticity coordinate system.

TABLE 29

| GCF | 475 nm<br>525 nm<br>600 nm | 16-16<br>83-81.5<br>30-28 | 16-11<br>81.5-80<br>28-22 | 11-8<br>80-78<br>22-17 | 8-6.5<br>78-75<br>17-14 | 6.5-5.5<br>75-73<br>14-11 | 5.5-4<br>73-70<br>11-9 | 4-3<br>70-67<br>9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | x |
| 0.41 | 0.118 | x | x | x | x | x | x | x |
| 0.35 | 0.101 | x | x | x | x | x | x | ○ |
| 0.30 | 0.084 | x | x | x | x | x | ○ | ○ |
| 0.25 | 0.067 | x | x | x | x | ○ | ○ | ○ |
| 0.20 | 0.050 | x | x | x | x | ○ | ○ | ○ |
| 475 nm | 500 nm | | | | | | | |
| Blue PL | | | | | | | | |

TABLE 30

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | x |
| 0.41 | 0.118 | x | x | x | x | x | x | x |
| 0.35 | 0.101 | x | x | x | x | x | x | o |
| 0.30 | 0.084 | x | x | x | x | x | o | o |
| 0.25 | 0.067 | x | x | x | x | o | o | o |
| 0.20 | 0.050 | x | x | x | x | o | o | o |
| 475 nm | 500 nm Blue PL | | | | | | | |

TABLE 31

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | x |
| 0.41 | 0.118 | x | x | x | x | x | x | x |
| 0.35 | 0.101 | x | x | x | x | x | x | o |
| 0.30 | 0.084 | x | x | x | x | x | o | o |
| 0.25 | 0.067 | x | x | x | x | o | o | o |
| 0.20 | 0.050 | x | x | x | x | o | o | o |
| 475 nm | 500 nm Blue PL | | | | | | | |

TABLE 32

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | x |
| 0.41 | 0.118 | x | x | x | x | x | x | o |
| 0.35 | 0.101 | x | x | x | x | x | o | o |
| 0.30 | 0.084 | x | x | x | x | o | o | o |
| 0.25 | 0.067 | x | x | x | x | o | o | o |
| 0.20 | 0.050 | x | x | x | o | o | o | o |
| 475 nm | 500 nm Blue PL | | | | | | | |

TABLE 33

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | x |
| 0.41 | 0.118 | x | x | x | x | x | x | o |
| 0.35 | 0.101 | x | x | x | x | x | o | o |
| 0.30 | 0.084 | x | x | x | x | x | o | o |
| 0.25 | 0.067 | x | x | x | x | o | o | o |
| 0.20 | 0.050 | x | x | x | o | o | o | o |
| 475 nm | 500 nm Blue PL | | | | | | | |

TABLE 34

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | x |
| 0.41 | 0.118 | x | x | x | x | x | x | o |
| 0.35 | 0.101 | x | x | x | x | x | o | o |
| 0.30 | 0.084 | x | x | x | x | o | o | o |
| 0.25 | 0.067 | x | x | o | o | o | o | o |
| 0.20 | 0.050 | x | o | o | o | o | o | o |
| 475 nm | 500 nm Blue PL | | | | | | | |

TABLE 35

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | x |
| 0.41 | 0.118 | x | x | x | x | x | x | o |
| 0.35 | 0.101 | x | x | x | x | x | o | o |
| 0.30 | 0.084 | x | x | x | x | o | o | o |
| 0.25 | 0.067 | x | x | o | o | o | o | o |
| 0.20 | 0.050 | x | o | o | o | o | o | o |
| 475 nm | 500 nm Blue PL | | | | | | | |

TABLE 36

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | o |
| 0.41 | 0.118 | x | x | x | x | x | o | o |
| 0.35 | 0.101 | x | x | x | x | o | o | o |
| 0.30 | 0.084 | x | x | x | o | o | o | o |
| 0.25 | 0.067 | x | x | o | o | o | o | o |
| 0.20 | 0.050 | x | x | o | o | o | o | o |
| 475 nm | 500 nm Blue PL | | | | | | | |

TABLE 37

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | o |
| 0.41 | 0.118 | x | x | x | x | x | o | o |
| 0.35 | 0.101 | x | x | x | x | o | o | o |
| 0.30 | 0.084 | x | x | x | o | o | o | o |
| 0.25 | 0.067 | x | x | o | o | o | o | o |
| 0.20 | 0.050 | x | x | o | o | o | o | o |
| 475 nm | 500 nm Blue PL | | | | | | | |

TABLE 38

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | x |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | ○ | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | ○ | ○ | ○ | ○ | ○ | ○ |
| 475 nm | 500 nm Blue PL | | | | | | | |

TABLE 39

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | x |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | x | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | ○ | ○ | ○ | ○ | ○ | ○ |
| 475 nm | 500 nm Blue PL | | | | | | | |

TABLE 40

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | x |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | x | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | ○ | ○ | ○ | ○ | ○ | ○ |
| 475 nm | 500 nm Blue PL | | | | | | | |

TABLE 41

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | x |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | x | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | ○ | ○ | ○ | ○ | ○ | ○ |
| 475 nm | 500 nm Blue PL | | | | | | | |

TABLE 42

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | x |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | ○ | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | ○ | ○ | ○ | ○ | ○ | ○ |
| 475 nm | 500 nm Blue PL | | | | | | | |

TABLE 43

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | x | ○ | ○ | ○ |
| 0.30 | 0.084 | x | x | x | ○ | ○ | ○ | ○ |
| 0.25 | 0.067 | x | x | x | ○ | ○ | ○ | ○ |
| 0.20 | 0.050 | x | x | ○ | ○ | ○ | ○ | ○ |
| 475 nm | 500 nm Blue PL | | | | | | | |

TABLE 44

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | ○ | ○ | ○ |
| 0.35 | 0.101 | x | x | x | x | ○ | ○ | ○ |
| 0.30 | 0.084 | x | x | x | ○ | ○ | ○ | ○ |
| 0.25 | 0.067 | x | x | x | ○ | ○ | ○ | ○ |
| 0.20 | 0.050 | x | x | ○ | ○ | ○ | ○ | ○ |
| 475 nm | 500 nm Blue PL | | | | | | | |

TABLE 45

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | ○ | ○ | ○ |
| 0.35 | 0.101 | x | x | x | x | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm | 500 nm Blue PL | | | | | | | |

TABLE 46

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | ○ | ○ | ○ |
| 0.35 | 0.101 | x | x | x | ○ | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | ○ | ○ | ○ | ○ | ○ | ○ |
| 475 nm | 500 nm Blue PL | | | | | | | |

TABLE 47

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | ○ | ○ | ○ |
| 0.35 | 0.101 | x | x | x | ○ | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | ○ | ○ | ○ | ○ | ○ | ○ |
| 475 nm | 500 nm Blue PL | | | | | | | |

TABLE 48

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | ○ | ○ | ○ |
| 0.35 | 0.101 | x | x | x | ○ | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | ○ | ○ | ○ | ○ | ○ | ○ |
| 475 nm | 500 nm Blue PL | | | | | | | |

TABLE 49

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | ○ | ○ | ○ |
| 0.35 | 0.101 | x | x | x | ○ | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | ○ | ○ | ○ | ○ | ○ | ○ |
| 475 nm | 500 nm Blue PL | | | | | | | |

TABLE 50

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | ○ | ○ |
| 0.48 | 0.135 | x | x | x | x | ○ | ○ | ○ |
| 0.41 | 0.118 | x | x | x | ○ | ○ | ○ | ○ |
| 0.35 | 0.101 | x | x | x | ○ | ○ | ○ | ○ |
| 0.30 | 0.084 | x | x | ○ | ○ | ○ | ○ | ○ |
| 0.25 | 0.067 | x | ○ | ○ | ○ | ○ | ○ | ○ |
| 0.20 | 0.050 | x | ○ | ○ | ○ | ○ | ○ | ○ |
| 475 nm | 500 nm Blue PL | | | | | | | |

TABLE 51

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | ○ | ○ |
| 0.48 | 0.135 | x | x | x | x | ○ | ○ | ○ |
| 0.41 | 0.118 | x | x | x | ○ | ○ | ○ | ○ |
| 0.35 | 0.101 | x | x | x | ○ | ○ | ○ | ○ |
| 0.30 | 0.084 | x | x | ○ | ○ | ○ | ○ | ○ |
| 0.25 | 0.067 | x | ○ | ○ | ○ | ○ | ○ | ○ |
| 0.20 | 0.050 | x | ○ | ○ | ○ | ○ | ○ | ○ |
| 475 nm | 500 nm Blue PL | | | | | | | |

TABLE 52

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | ○ | ○ |
| 0.48 | 0.135 | x | x | x | ○ | ○ | ○ | ○ |
| 0.41 | 0.118 | x | x | x | ○ | ○ | ○ | ○ |
| 0.35 | 0.101 | x | x | ○ | ○ | ○ | ○ | ○ |
| 0.30 | 0.084 | x | x | ○ | ○ | ○ | ○ | ○ |
| 0.25 | 0.067 | x | ○ | ○ | ○ | ○ | ○ | ○ |
| 0.20 | 0.050 | x | ○ | ○ | ○ | ○ | ○ | ○ |
| 475 nm | 500 nm Blue PL | | | | | | | |

TABLE 53

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | ○ | ○ |
| 0.48 | 0.135 | x | x | x | ○ | ○ | ○ | ○ |
| 0.41 | 0.118 | x | x | x | ○ | ○ | ○ | ○ |
| 0.35 | 0.101 | x | x | ○ | ○ | ○ | ○ | ○ |
| 0.30 | 0.084 | x | x | ○ | ○ | ○ | ○ | ○ |
| 0.25 | 0.067 | x | ○ | ○ | ○ | ○ | ○ | ○ |
| 0.20 | 0.050 | x | ○ | ○ | ○ | ○ | ○ | ○ |
| 475 nm | 500 nm Blue PL | | | | | | | |

TABLE 54

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | o |
| 0.51 | 0.157 | x | x | x | x | x | o | o |
| 0.48 | 0.135 | x | x | x | o | o | o | o |
| 0.41 | 0.118 | x | x | x | o | o | o | o |
| 0.35 | 0.101 | x | x | o | o | o | o | o |
| 0.30 | 0.084 | x | x | o | o | o | o | o |
| 0.25 | 0.067 | x | o | o | o | o | o | o |
| 0.20 | 0.050 | x | o | o | o | o | o | o |
| 475 nm Blue PL | 500 nm | | | | | | | |

TABLE 55

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | o |
| 0.51 | 0.157 | x | x | x | x | x | o | o |
| 0.48 | 0.135 | x | x | x | o | o | o | o |
| 0.41 | 0.118 | x | x | x | o | o | o | o |
| 0.35 | 0.101 | x | x | o | o | o | o | o |
| 0.30 | 0.084 | x | x | o | o | o | o | o |
| 0.25 | 0.067 | x | o | o | o | o | o | o |
| 0.20 | 0.050 | x | o | o | o | o | o | o |
| 475 nm Blue PL | 500 nm | | | | | | | |

TABLE 56

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | o |
| 0.51 | 0.157 | x | x | x | o | o | o | o |
| 0.48 | 0.135 | x | x | x | o | o | o | o |
| 0.41 | 0.118 | x | x | o | o | o | o | o |
| 0.35 | 0.101 | x | x | o | o | o | o | o |
| 0.30 | 0.084 | x | o | o | o | o | o | o |
| 0.25 | 0.067 | x | o | o | o | o | o | o |
| 0.20 | 0.050 | x | o | o | o | o | o | o |
| 475 nm Blue PL | 500 nm | | | | | | | |

It is to be noted that the simulations of [Table 29], [Table 36], [Table 43], and [Table 50] were carried out while the transmission factor of the red color filter ranged from 27% to 32% at the wavelength of 580 nm and from 78% to 81% at the wavelength of 600 nm.

Meanwhile, the simulations of [Table 30], [Table 37], [Table 44], and [Table 51] were carried out while the transmission factor of the red color filter ranged from 22% to 27% at the wavelength of 580 nm and from 75% to 78% at the wavelength of 600 nm.

The simulations of [Table 31], [Table 38], [Table 45], and [Table 52] were carried out while the transmission factor of the red color filter ranged from 18% to 22% at the wavelength of 580 nm and from 72% to 75% at the wavelength of 600 nm.

The simulations of [Table 32], [Table 39], [Table 46], and [Table 53] were carried out while the transmission factor of the red color filter ranged from 15% to 18% at the wavelength of 580 nm and from 69% to 72% at the wavelength of 600 nm.

The simulations of [Table 33], [Table 40], [Table 47], and [Table 54] were carried out while the transmission factor of the red color filter ranged from 13% to 15% at the wavelength of 580 nm and from 66% to 69% at the wavelength of 600 nm.

The simulations of [Table 34], [Table 41], [Table 48], and [Table 55] were carried out while the transmission factor of the red color filter ranged from 10% to 13% at the wavelength of 580 nm and from 64% to 66% at the wavelength of 600 nm.

The simulations of [Table 35], [Table 42], [Table 49], and [Table 56] were carried out while the transmission factor of the red color filter ranged from 8% to 10% at the wavelength of 580 nm and from 62% to 64% at the wavelength of 600 nm.

On the other hand, as regards the white chromaticity of the white light sources, the ranges of ($0.2304 \leq x < 0.2522$, $0.1805 \leq y < 0.2143$) were used for [Table 29] to [Table 35]; the ranges of ($0.2522 \leq x < 0.2603$, $0.2143 \leq y < 0.2357$) were used for [Table 36] to [Table 42]; the ranges of ($0.2603 \leq x < 0.2727$, $0.2357 \leq y < 0.2548$) were used for [Table 43] to [Table 49]; and the ranges of ($0.2705 \leq x < 0.2830$, $0.2548 \leq y < 0.2699$) were used for [Table 50] to [Table 56]. Then, the central chromaticity within each chromaticity range was used for the simulation.

From the results given above, it is possible to calculate the chromaticity points ($x_R$, $y_R$) and ($x_G$, $y_G$) regarding red and green and select an apparatus configuration that the imaginary straight line interconnecting the chromaticity points ($x_R$, $y_R$) and ($x_G$, $y_G$) passes only those points which are equal to or higher than (0.300, 0.600) with regard to at least one of the x-axis component and the y-axis component of the chromaticity coordinate system.

It is to be noted that, although all of the apparatus configurations denoted by ○ in the tables above are considered preferable, particularly preferable configurations have a white chromaticity within the ranges of ($0.2304 \leq x < 0.2522$, $0.1805 \leq y < 0.2143$). This is because the ranges are particularly preferable to the white chromaticity of the sole CCFL.

First, it was confirmed successfully that it is possible to obtain light corresponding to the particular green chromaticity point if the apparatus configuration is at least such as follows. In particular, the white chromaticity of the white light sources is ($0.2304 \leq x < 0.2522$, $0.1805 \leq y < 0.2143$) on the chromaticity coordinate system; the transmission factor of the green color filter is equal to or higher than 3% but equal to or lower than 6.5% at the wavelength of 475 nm, equal to or higher than 67% but equal to or lower than 76% at the wavelength of 525 nm, and equal to or higher than 7% but equal to or lower than 14% at the wavelength of 600 nm; the transmission factor of the red color filter is equal to or higher than 18% but equal to or lower than 32% at the wavelength of 580 nm and equal to or higher than 72% but equal to or lower than 81% at the wavelength of 600 nm; and the light emission intensity of the blue fluorescent material is equal to or higher than 20% but equal to or lower than 30% at the wavelength of 475 nm and equal to or higher than 5% but equal to or lower than 8.4% at the wavelength of 500 nm with respect to the maximum light emission intensity of the blue fluorescent material.

Further, it was confirmed successfully that it is possible to obtain light corresponding to the particular green chromaticity point if the apparatus configuration is at least such as follows. In particular, the white chromaticity of the white light sources is ($0.2304 \leq x < 0.2522$, $0.1805 \leq y < 0.2143$) on the chromaticity coordinate system; the transmission factor of the green color filter is equal to or higher than 3% but equal to or lower than 5.5% at the wavelength of 475 nm, equal to or higher than 67% but equal to or lower than 73% at the wavelength of 525 nm, and equal to or higher than 7% but equal to or lower than 11% at the wavelength of 600 nm; the transmission factor of the red color filter is equal to or higher than 18% but equal to or lower than 32% at the wavelength of 580 nm and equal to or higher than 72% but equal to or lower than 81% at the wavelength of 600 nm; and the light emission intensity of the blue fluorescent material is equal to or higher than 30% but equal to or lower than 35% at the wavelength of 475 nm and equal to or higher than 8.4% but equal to or lower than 10.1% at the wavelength of 500 nm with respect to the maximum light emission intensity of the blue fluorescent material.

Furthermore, it was confirmed successfully that it is possible to obtain light corresponding to the particular green chromaticity point if the apparatus configuration is at least such as follows. In particular, the white chromaticity of the white light sources is ($0.2304 \leq x < 0.2522$, $0.1805 \leq y < 0.2143$) on the chromaticity coordinate system; the transmission factor of the green color filter is equal to or higher than 3% but equal to or lower than 4% at the wavelength of 475 nm, equal to or higher than 67% but equal to or lower than 70% at the wavelength of 525 nm, and equal to or higher than 7% but equal to or lower than 9% at the wavelength of 600 nm; the transmission factor of the red color filter is equal to or higher than 18% but equal to or lower than 32% at the wavelength of 580 nm and equal to or higher than 72% but equal to or lower than 81% at the wavelength of 600 nm; and the light emission intensity of the blue fluorescent material is equal to or higher than 30% but equal to or lower than 41% at the wavelength of 475 nm and equal to or higher than 10.1% but equal to or lower than 11.8% at the wavelength of 500 nm with respect to the maximum light emission intensity of the blue fluorescent material.

Also it was confirmed successfully that it is possible to obtain light corresponding to the particular green chromaticity point if the apparatus configuration is at least such as follows. In particular, the white chromaticity of the white light sources is ($0.2304 \leq x < 0.2522$, $0.1805 \leq y < 0.2143$) on the chromaticity coordinate system; the transmission factor of the green color filter is equal to or higher than 3% but equal to or lower than 8% at the wavelength of 475 nm, equal to or higher than 67% but equal to or lower than 78% at the wavelength of 525 nm, and equal to or higher than 7% but equal to or lower than 17% at the wavelength of 600 nm; the transmission factor of the red color filter is equal to or higher than 13% but equal to or lower than 18% at the wavelength of 580 nm and equal to or higher than 66% but equal to or lower than 72% at the wavelength of 600 nm; and the light emission intensity of the blue fluorescent material is equal to or higher than 20% but equal to or lower than 25% at the wavelength of 475 nm and equal to or higher than 5% but equal to or lower than 6.7% at the wavelength of 500 nm with respect to the maximum light emission intensity of the blue fluorescent material.

Also it was confirmed successfully that it is possible to obtain light corresponding to the particular green chromaticity point if the apparatus configuration is at least such as follows. In particular, the white chromaticity of the white light sources is ($0.2304 \leq x < 0.2522$, $0.1805 \leq y < 0.2143$) on the chromaticity coordinate system; the transmission factor of the green color filter is equal to or higher than 3% but equal to or lower than 6.5% at the wavelength of 475 nm, equal to or higher than 67% but equal to or lower than 76% at the wavelength of 525 nm, and equal to or higher than 7% but equal to or lower than 14% at the wavelength of 600 nm; the transmission factor of the red color filter is, equal to or higher than 13% but equal to or lower than 18% at the wavelength of 580 nm and equal to or higher than 66% but equal to or lower than 72% at the wavelength of 600 nm; and the light emission intensity of the blue fluorescent material is equal to or higher than 25% but equal to or lower than 30% at the wavelength of 475 nm and equal to or higher than 6.7% but equal to or lower than 8.4% at the wavelength of 500 nm with respect to the maximum light emission intensity of the blue fluorescent material.

Also it was confirmed successfully that it is possible to obtain light corresponding to the particular green chromaticity point if the apparatus configuration is at least such as follows. In particular, the white chromaticity of the white light sources is ($0.2304 \leq x < 0.2522$, $0.1805 \leq y < 0.2143$) on the chromaticity coordinate system; the transmission factor of the green color filter is equal to or higher than 3% but equal to or lower than 5.5% at the wavelength of 475 nm, equal to or higher than 67% but equal to or lower than 73% at the wavelength of 525 nm, and equal to or higher than 7% but equal to or lower than 11% at the wavelength of 600 nm; the transmission factor of the red color filter is equal to or higher than 13% but equal to or lower than 18% at the wavelength of 580 nm and equal to or higher than 66% but equal to or lower than 72% at the wavelength of 600 nm; and the light emission intensity of the blue fluorescent material is equal to or higher than 30% but equal to or lower than 41% at the wavelength of 475 nm and equal to or higher than 8.4% but equal to or lower than 11.8% at the wavelength of 500 nm with respect to the maximum light emission intensity of the blue fluorescent material.

Also it was confirmed successfully that it is possible to obtain light corresponding to the particular green chromaticity point if the apparatus configuration is at least such as follows. In particular, the white chromaticity of the white light sources is ($0.2304 \leq x < 0.2522$, $0.1805 \leq y < 0.2143$) on the chromaticity coordinate system; the transmission factor of the green color filter is equal to or higher than 3% but equal to or lower than 4% at the wavelength of 475 nm, equal to or higher than 67% but equal to or lower than 70% at the wavelength of 525 nm, and equal to or higher than 7% but equal to or lower than 9% at the wavelength of 600 nm; the transmission factor of the red color filter is equal to or higher than 13% but equal to or lower than 18% at the wavelength of 580 nm and equal to or higher than 66% but equal to or lower than 72% at the wavelength of 600 nm; and the light emission intensity of the blue fluorescent material is equal to or higher than 41% but equal to or lower than 46% at the wavelength of 475 nm and equal to or higher than 11.8% but equal to or lower than 13.5% at the wavelength of 500 nm with respect to the maximum light emission intensity of the blue fluorescent material.

Also it was confirmed successfully that it is possible to obtain light corresponding to the particular green chromaticity point if the apparatus configuration is at least such as follows. In particular, the white chromaticity of the white light sources is ($0.2304 \leq x < 0.2522$, $0.1805 \leq y < 0.2143$) on the chromaticity coordinate system; the transmission factor of the green color filter is equal to or higher than 3% but equal to or lower than 16% at the wavelength of 475 nm, and equal to or higher than 67% but equal to or lower than 81.5% at the wavelength of 525 nm, and equal to or higher than 7% but equal to or lower than 26% at the wavelength of 600 nm; the transmission factor of the red color filter is equal to or higher than 8% but equal to or lower than 13% at the wavelength of 580 nm and equal to or higher than 62% but equal to or lower than 66% at the wavelength of 600 nm; and the light emission intensity of the blue fluorescent material is equal to or higher than 20% but equal to or lower than 25% at the wavelength of 475 nm and equal to or higher than 5% but equal to or lower than 6.7% at the wavelength of 500 nm with respect to the maximum light emission intensity of the blue fluorescent material.

Also it was confirmed successfully that it is possible to obtain light corresponding to the particular green chromaticity point if the apparatus configuration is at least such as follows. In particular, the white chromaticity of the white light sources is ($0.2304 \leqq x < 0.2522$, $0.1805 \leqq y < 0.2143$) on the chromaticity coordinate system; the transmission factor of the green color filter is equal to or higher than 3% but equal to or lower than 11% at the wavelength of 475 nm, equal to or higher than 67% but equal to or lower than 80% at the wavelength of 525 nm, and equal to or higher than 7% but equal to or lower than 22% at the wavelength of 600 nm; the transmission factor of the red color filter is equal to or higher than 8% but equal to or lower than 13% at the wavelength of 580 nm and equal to or higher than 62% but equal to or lower than 66% at the wavelength of 600 nm; and the light emission intensity of the blue fluorescent material is equal to or higher than 20% but equal to or lower than 30% at the wavelength of 475 nm and equal to or higher than 6.7% but equal to or lower than 8.4% at the wavelength of 500 nm with respect to the maximum light emission intensity of the blue fluorescent material.

Also it was confirmed successfully that it is possible to obtain light corresponding to the particular green chromaticity point if the apparatus configuration is at least such as follows. In particular, the white chromaticity of the white light sources is ($0.2304 \leqq x < 0.2522$, $0.1805 \leqq y < 0.2143$) on the chromaticity coordinate system; the transmission factor of the green color filter is equal to or higher than 3% but equal to or lower than 6.5% at the wavelength of 475 nm, equal to or higher than 67% but equal to or lower than 76% at the wavelength of 525 nm, and equal to or higher than 7% but equal to or lower than 14% at the wavelength of 600 nm; the transmission factor of the red color filter is equal to or higher than 8% but equal to or lower than 13% at the wavelength of 580 nm and equal to or higher than 62% but equal to or lower than 66% at the wavelength of 600 nm; and the light emission intensity of the blue fluorescent material is equal to or higher than 30% but equal to or lower than 35% at the wavelength of 475 nm and equal to or higher than 8.4% but equal to or lower than 10.1% at the wavelength of 500 nm with respect to the maximum light emission intensity of the blue fluorescent material.

Also it was confirmed successfully that it is possible to obtain light corresponding to the particular green chromaticity point if the apparatus configuration is at least such as follows. In particular, the white chromaticity of the white light sources is ($0.2304 \leqq x < 0.2522$, $0.1805 \leqq y < 0.2143$) on the chromaticity coordinate system; the transmission factor of the green color filter is equal to or higher than 3% but equal to or lower than 5.5% at the wavelength of 475 nm, and equal to or higher than 67% but equal to or lower than 73% at the wavelength of 525 nm, and equal to or higher than 7% but equal to or lower than 11% at the wavelength of 600 nm; the transmission factor of the red color filter is equal to or higher than 8% but equal to or lower than 13% at the wavelength of 580 nm and equal to or higher than 62% but equal to or lower than 66% at the wavelength of 600 nm; and the light emission intensity of the blue fluorescent material is equal to or higher than 35% but equal to or lower than 41% at the wavelength of 475 nm and equal to or higher than 10.1% but equal to or lower than 11.8% at the wavelength of 500 nm with respect to the maximum light emission intensity of the blue fluorescent material.

Also it was confirmed successfully that it is possible to obtain light corresponding to the particular green chromaticity point if the apparatus configuration is at least such as follows. In particular, the white chromaticity of the white light sources is ($0.2304 \leqq x < 0.2522$, $0.1805 \leqq y < 0.2143$) on the chromaticity coordinate system; the transmission factor of the green color filter is equal to or higher than 3% but equal to or lower than 4% at the wavelength of 475 nm, equal to or higher than 67% but equal to or lower than 70% at the wavelength of 525 nm, and equal to or higher than 7% but equal to or lower than 9% at the wavelength of 600 nm; the transmission factor of the red color filter is equal to or higher than 8% but equal to or lower than 13% at the wavelength of 580 nm and equal to or higher than 62% but equal to or lower than 66% at the wavelength of 600 nm; and the light emission intensity of the blue fluorescent material is equal to or higher than 41% but equal to or lower than 46% at the wavelength of 475 nm and equal to or higher than 11.8% but equal to or lower than 13.5% at the wavelength of 500 nm with respect to the maximum light emission intensity of the blue fluorescent material.

Third Working Example

A result of investigations carried out with regard to a configuration according to a third working example of the present application which used a fluorescent material having a composition represented by the [Chemical formula 8] given hereinabove as a green fluorescent material and another fluorescent material having a composition represented by the [Chemical formula 9] given hereinabove as a red fluorescent material is described.

In the present working example, the light emission spectrum of the CCFL was varied within a range of $0.2405 \leqq x \leqq 0.2830$ or another range of $0.1802 \leqq y \leqq 0.2600$. Further, each of the ranges mentioned was divided into three smaller regions of ($0.2405 \leqq x < 0.2468$, $0.2148 \leqq y < 0.2292$), ($0.2468 \leqq x < 0.2588$, $0.2292 \leqq y < 0.2420$), and ($0.2588 \leqq x < 0.2705$, $0.2420 \leqq y < 0.2600$). Then, the compounding ratio of R, G, and B was varied through calculation to perform calculation so that the chromaticity may be provided at the chromaticity point at the center of each of the ranges. The thus calculated chromaticity point was determined as the chromaticity point within the range.

It is to be noted that, in the present working example, the variation of the shape of the transmission spectrum of the green color filter and the variation of the shape of the blue light emission spectrum are similar to those in the first working example described hereinabove.

Chromaticity calculation was carried out in a similar manner as in the first working example, and the chromaticity points ($x_R$, $y_R$) and ($x_G$, $y_G$) were calculated regarding red and green. Then, it was examined whether or not an imaginary straight line interconnecting the chromaticity points ($x_R$, $y_R$) and ($x_G$, $y_G$) passes only those points which are equal to or higher than (0.300, 0.600) with regard to at least one of an x-axis component and a y-axis component of the chromaticity coordinate system. Such results as given in the following tables were obtained from the examinations. In the tables, ○ represents an apparatus configuration that the imaginary straight line passes only those points which are equal to or higher than (0.300, 0.600) with regard to at least one of the x-axis component and the y-axis component of the chromaticity coordinate system. On the other hand, x represents another apparatus configuration that the imaginary straight line passes also a point other than those points which are equal to or higher than (0.300, 0.600) with regard to at least one of the x-axis component and the y-axis component of the chromaticity coordinate system.

TABLE 57

| GCF | 475 nm<br>525 nm<br>600 nm | 16-16<br>83-81.5<br>30-28 | 16-11<br>81.5-80<br>28-22 | 11-8<br>80-78<br>22-17 | 8-6.5<br>78-75<br>17-14 | 6.5-5.5<br>75-73<br>14-11 | 5.5-4<br>73-70<br>11-9 | 4-3<br>70-67<br>9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | x | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm | 500 nm Blue PL | | | | | | | |

TABLE 58

| GCF | 475 nm<br>525 nm<br>600 nm | 16-16<br>83-81.5<br>30-28 | 16-11<br>81.5-80<br>28-22 | 11-8<br>80-78<br>22-17 | 8-6.5<br>78-75<br>17-14 | 6.5-5.5<br>75-73<br>14-11 | 5.5-4<br>73-70<br>11-9 | 4-3<br>70-67<br>9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | x | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm | 500 nm Blue PL | | | | | | | |

TABLE 59

| GCF | 475 nm<br>525 nm<br>600 nm | 16-16<br>83-81.5<br>30-28 | 16-11<br>81.5-80<br>28-22 | 11-8<br>80-78<br>22-17 | 8-6.5<br>78-75<br>17-14 | 6.5-5.5<br>75-73<br>14-11 | 5.5-4<br>73-70<br>11-9 | 4-3<br>70-67<br>9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm | 500 nm Blue PL | | | | | | | |

TABLE 60

| GCF | 475 nm<br>525 nm<br>600 nm | 16-16<br>83-81.5<br>30-28 | 16-11<br>81.5-80<br>28-22 | 11-8<br>80-78<br>22-17 | 8-6.5<br>78-75<br>17-14 | 6.5-5.5<br>75-73<br>14-11 | 5.5-4<br>73-70<br>11-9 | 4-3<br>70-67<br>9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm | 500 nm Blue PL | | | | | | | |

TABLE 61

| GCF | 475 nm<br>525 nm<br>600 nm | 16-16<br>83-81.5<br>30-28 | 16-11<br>81.5-80<br>28-22 | 11-8<br>80-78<br>22-17 | 8-6.5<br>78-75<br>17-14 | 6.5-5.5<br>75-73<br>14-11 | 5.5-4<br>73-70<br>11-9 | 4-3<br>70-67<br>9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm | 500 nm Blue PL | | | | | | | |

TABLE 62

| GCF | 475 nm<br>525 nm<br>600 nm | 16-16<br>83-81.5<br>30-28 | 16-11<br>81.5-80<br>28-22 | 11-8<br>80-78<br>22-17 | 8-6.5<br>78-75<br>17-14 | 6.5-5.5<br>75-73<br>14-11 | 5.5-4<br>73-70<br>11-9 | 4-3<br>70-67<br>9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | x | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm | 500 nm Blue PL | | | | | | | |

TABLE 63

| GCF | 475 nm<br>525 nm<br>600 nm | 16-16<br>83-81.5<br>30-28 | 16-11<br>81.5-80<br>28-22 | 11-8<br>80-78<br>22-17 | 8-6.5<br>78-75<br>17-14 | 6.5-5.5<br>75-73<br>14-11 | 5.5-4<br>73-70<br>11-9 | 4-3<br>70-67<br>9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ○ |
| 0.41 | 0.118 | x | x | x | x | x | x | ○ |
| 0.35 | 0.101 | x | x | x | x | x | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm | 500 nm Blue PL | | | | | | | |

TABLE 64

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | x | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm | 500 nm Blue PL | | | | | | | |

TABLE 65

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | x | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm | 500 nm Blue PL | | | | | | | |

TABLE 66

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | x | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm | 500 nm Blue PL | | | | | | | |

TABLE 67

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | x | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm | 500 nm Blue PL | | | | | | | |

TABLE 68

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | ○ | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm | 500 nm Blue PL | | | | | | | |

TABLE 69

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | ○ | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm | 500 nm Blue PL | | | | | | | |

TABLE 70

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | x | ○ | ○ |
| 0.35 | 0.101 | x | x | x | ○ | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | x | ○ | ○ | ○ | ○ | ○ |
| 475 nm | 500 nm Blue PL | | | | | | | |

TABLE 71

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | ○ |
| 0.51 | 0.157 | x | x | x | x | x | ○ | ○ |
| 0.48 | 0.135 | x | x | x | x | x | ○ | ○ |
| 0.41 | 0.118 | x | x | x | x | ○ | ○ | ○ |
| 0.35 | 0.101 | x | x | x | ○ | ○ | ○ | ○ |
| 0.30 | 0.084 | x | x | ○ | ○ | ○ | ○ | ○ |
| 0.25 | 0.067 | x | x | ○ | ○ | ○ | ○ | ○ |
| 0.20 | 0.050 | x | ○ | ○ | ○ | ○ | ○ | ○ |
| 475 nm | 500 nm Blue PL | | | | | | | |

TABLE 72

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | o |
| 0.51 | 0.157 | x | x | x | x | x | o | o |
| 0.48 | 0.135 | x | x | x | x | x | o | o |
| 0.41 | 0.118 | x | x | x | x | o | o | o |
| 0.35 | 0.101 | x | x | x | o | o | o | o |
| 0.30 | 0.084 | x | x | o | o | o | o | o |
| 0.25 | 0.067 | x | x | o | o | o | o | o |
| 0.20 | 0.050 | x | x | o | o | o | o | o |
| | 475 nm Blue PL | 500 nm | | | | | | |

TABLE 73

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | o |
| 0.51 | 0.157 | x | x | x | x | x | o | o |
| 0.48 | 0.135 | x | x | x | x | x | o | o |
| 0.41 | 0.118 | x | x | x | x | o | o | o |
| 0.35 | 0.101 | x | x | x | o | o | o | o |
| 0.30 | 0.084 | x | x | o | o | o | o | o |
| 0.25 | 0.067 | x | x | o | o | o | o | o |
| 0.20 | 0.050 | x | x | o | o | o | o | o |
| | 475 nm Blue PL | 500 nm | | | | | | |

TABLE 74

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | o |
| 0.51 | 0.157 | x | x | x | x | x | o | o |
| 0.48 | 0.135 | x | x | x | x | x | o | o |
| 0.41 | 0.118 | x | x | x | o | o | o | o |
| 0.35 | 0.101 | x | x | x | o | o | o | o |
| 0.30 | 0.084 | x | x | o | o | o | o | o |
| 0.25 | 0.067 | x | x | o | o | o | o | o |
| 0.20 | 0.050 | x | o | o | o | o | o | o |
| | 475 nm Blue PL | 500 nm | | | | | | |

TABLE 75

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | o |
| 0.51 | 0.157 | x | x | x | x | x | o | o |
| 0.48 | 0.135 | x | x | x | x | x | o | o |
| 0.41 | 0.118 | x | x | x | o | o | o | o |
| 0.35 | 0.101 | x | x | x | o | o | o | o |
| 0.30 | 0.084 | x | x | o | o | o | o | o |
| 0.25 | 0.067 | x | x | o | o | o | o | o |
| 0.20 | 0.050 | x | o | o | o | o | o | o |
| | 475 nm Blue PL | 500 nm | | | | | | |

TABLE 76

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | o |
| 0.51 | 0.157 | x | x | x | x | x | o | o |
| 0.48 | 0.135 | x | x | x | x | x | o | o |
| 0.41 | 0.118 | x | x | x | o | o | o | o |
| 0.35 | 0.101 | x | x | x | o | o | o | o |
| 0.30 | 0.084 | x | x | o | o | o | o | o |
| 0.25 | 0.067 | x | x | o | o | o | o | o |
| 0.20 | 0.050 | x | o | o | o | o | o | o |
| | 475 nm Blue PL | 500 nm | | | | | | |

TABLE 77

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | o |
| 0.51 | 0.157 | x | x | x | x | x | o | o |
| 0.48 | 0.135 | x | x | x | x | x | o | o |
| 0.41 | 0.118 | x | x | x | o | o | o | o |
| 0.35 | 0.101 | x | x | x | o | o | o | o |
| 0.30 | 0.084 | x | x | o | o | o | o | o |
| 0.25 | 0.067 | x | x | o | o | o | o | o |
| 0.20 | 0.050 | x | o | o | o | o | o | o |
| | 475 nm Blue PL | 500 nm | | | | | | |

It is to be noted that the simulations of [Table 57], [Table 64], and [Table 71] were carried out while the transmission factor of the red color filter ranged from 27% to 32% at the wavelength of 580 nm and from 78% to 81% at the wavelength of 600 nm.

Meanwhile, the simulations of [Table 58], [Table 65], and [Table 72] were carried out while the transmission factor of the red color filter ranged from 22% to 27% at the wavelength of 580 nm and from 75% to 78% at the wavelength of 600 nm.

The simulations of [Table 59], [Table 66], and [Table 73] were carried out while the transmission factor of the red color filter ranged from 18% to 22% at the wavelength of 580 nm and from 72% to 75% at the wavelength of 600 nm.

The simulations of [Table 60], [Table 67], and [Table 74] were carried out while the transmission factor of the red color filter ranged from 15% to 18% at the wavelength of 580 nm and from 69% to 72% at the wavelength of 600 nm.

The simulations of [Table 61], [Table 68], and [Table 75] were carried out while the transmission factor of the red color filter ranged from 13% to 15% at the wavelength of 580 nm and from 66% to 69% at the wavelength of 600 nm.

The simulations of [Table 62], [Table 69], and [Table 76] were carried out while the transmission factor of the red color filter ranged from 10% to 13% at the wavelength of 580 nm and from 64% to 66% at the wavelength of 600 nm.

The simulations of [Table 63], [Table 70], and [Table 77] were carried out while the transmission factor of the red color filter ranged from 8% to 10% at the wavelength of 580 nm and from 62% to 64% at the wavelength of 600 nm.

From the results given above, it is possible to calculate the chromaticity points $(x_R, y_R)$ and $(x_G, y_G)$ regarding red and green and select an apparatus configuration that the imaginary straight line interconnecting the chromaticity points $(x_R, y_R)$ and $(x_G, y_G)$ passes only those points which are equal to or higher than (0.300, 0.600) with regard to at least one of the x-axis component and the y-axis component of the chromaticity coordinate system.

Fourth Working Example

A result of an investigation carried out with regard to a configuration according to a fourth working example which used a fluorescent material having a composition represented by the [Chemical formula 8] given hereinabove as a green fluorescent material and another fluorescent material having a composition represented by the [Chemical formula 10] given hereinabove as a red fluorescent material is described.

In the present working example, the light emission spectrum of the CCFL was varied within a range of $0.2304 \leq x \leq 02892$ or another range of $0.1805 \leq y \leq 0.2699$. Further, each of the ranges mentioned was divided into three smaller regions of $(0.2304 \leq x < 0.2522, 0.2143 \leq y < 0.2357)$, $(0.2522 \leq x < 0.2603, 0.2357 \leq y < 0.2548)$, and $(0.2603 \leq x < 0.2727, 0.2548 \leq y < 0.2699)$. Then, the compounding ratio of R, G, and B was varied through calculation to perform calculation so that the chromaticity may be provided at the chromaticity point at the center of each of the ranges. The thus calculated chromaticity point was determined as the chromaticity point within the range.

It is to be noted that, in the present working example, the variation of the shape of the transmission spectrum of the green color filter and the variation of the shape of the blue light emission spectrum are similar to those in the first working example described hereinabove.

Chromaticity calculation was carried out in a similar manner as in the first working example, and the chromaticity points $(x_R, y_R)$ and $(x_G, y_G)$ were calculated regarding red and green. Then, it was examined whether or not an imaginary straight line interconnecting the chromaticity points $(x_R, y_R)$ and $(x_G, y_G)$ passes only those points which are equal to or higher than (0.300, 0.600) with regard to at least one of an x-axis component and a y-axis component of the chromaticity coordinate system. Such results as given in the following tables were obtained from the examinations. In the tables, ◯ represents an apparatus configuration that the imaginary straight line passes only those points which are equal to or higher than (0.300, 0.600) with regard to at least one of the x-axis component and the y-axis component of the chromaticity coordinate system. On the other hand, x represents another apparatus configuration that the imaginary straight line passes also a point other than those points which are equal to or higher than (0.300, 0.600) with regard to at least one of the x-axis component and the y-axis component of the chromaticity coordinate system.

TABLE 78

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ◯ |
| 0.41 | 0.118 | x | x | x | x | x | ◯ | ◯ |
| 0.35 | 0.101 | x | x | x | x | ◯ | ◯ | ◯ |
| 0.30 | 0.084 | x | x | x | ◯ | ◯ | ◯ | ◯ |
| 0.25 | 0.067 | x | x | ◯ | ◯ | ◯ | ◯ | ◯ |
| 0.20 | 0.050 | x | x | ◯ | ◯ | ◯ | ◯ | ◯ |
| 475 nm | 500 nm Blue PL | | | | | | | |

TABLE 79

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | x |
| 0.48 | 0.135 | x | x | x | x | x | x | ◯ |
| 0.41 | 0.118 | x | x | x | x | x | ◯ | ◯ |
| 0.35 | 0.101 | x | x | x | x | ◯ | ◯ | ◯ |
| 0.30 | 0.084 | x | x | x | ◯ | ◯ | ◯ | ◯ |
| 0.25 | 0.067 | x | x | ◯ | ◯ | ◯ | ◯ | ◯ |
| 0.20 | 0.050 | x | x | ◯ | ◯ | ◯ | ◯ | ◯ |
| 475 nm | 500 nm Blue PL | | | | | | | |

TABLE 80

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | ◯ |
| 0.48 | 0.135 | x | x | x | x | x | ◯ | ◯ |
| 0.41 | 0.118 | x | x | x | x | x | ◯ | ◯ |
| 0.35 | 0.101 | x | x | x | ◯ | ◯ | ◯ | ◯ |
| 0.30 | 0.084 | x | x | x | ◯ | ◯ | ◯ | ◯ |
| 0.25 | 0.067 | x | x | ◯ | ◯ | ◯ | ◯ | ◯ |
| 0.20 | 0.050 | x | ◯ | ◯ | ◯ | ◯ | ◯ | ◯ |
| 475 nm | 500 nm Blue PL | | | | | | | |

TABLE 81

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | ◯ |
| 0.48 | 0.135 | x | x | x | x | x | ◯ | ◯ |
| 0.41 | 0.118 | x | x | x | x | x | ◯ | ◯ |
| 0.35 | 0.101 | x | x | x | ◯ | ◯ | ◯ | ◯ |
| 0.30 | 0.084 | x | x | x | ◯ | ◯ | ◯ | ◯ |
| 0.25 | 0.067 | x | x | ◯ | ◯ | ◯ | ◯ | ◯ |
| 0.20 | 0.050 | x | ◯ | ◯ | ◯ | ◯ | ◯ | ◯ |
| 475 nm | 500 nm Blue PL | | | | | | | |

TABLE 82

| GCF | 475 nm 525 nm 600 nm | 16-16 83-81.5 30-28 | 16-11 81.5-80 28-22 | 11-8 80-78 22-17 | 8-6.5 78-75 17-14 | 6.5-5.5 75-73 14-11 | 5.5-4 73-70 11-9 | 4-3 70-67 9-7 |
|---|---|---|---|---|---|---|---|---|
| 0.56 | 0.170 | x | x | x | x | x | x | x |
| 0.51 | 0.157 | x | x | x | x | x | x | ◯ |
| 0.48 | 0.135 | x | x | x | x | x | ◯ | ◯ |
| 0.41 | 0.118 | x | x | x | x | x | ◯ | ◯ |
| 0.35 | 0.101 | x | x | x | ◯ | ◯ | ◯ | ◯ |
| 0.30 | 0.084 | x | x | x | ◯ | ◯ | ◯ | ◯ |
| 0.25 | 0.067 | x | x | ◯ | ◯ | ◯ | ◯ | ◯ |
| 0.20 | 0.050 | x | ◯ | ◯ | ◯ | ◯ | ◯ | ◯ |
| 475 nm | 500 nm Blue PL | | | | | | | |

TABLE 83

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | x |
| 0.51 | 0.157 | x | x | x | x | x | x | o |
| 0.48 | 0.135 | x | x | x | x | x | o | o |
| 0.41 | 0.118 | x | x | x | x | x | o | o |
| 0.35 | 0.101 | x | x | x | o | o | o | o |
| 0.30 | 0.084 | x | x | x | o | o | o | o |
| 0.25 | 0.067 | x | x | o | o | o | o | o |
| 0.20 | 0.050 | x | o | o | o | o | o | o |

475 nm / 500 nm Blue PL

TABLE 84

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | x |
| 0.51 | 0.157 | x | x | x | x | x | x | o |
| 0.48 | 0.135 | x | x | x | x | x | o | o |
| 0.41 | 0.118 | x | x | x | x | x | o | o |
| 0.35 | 0.101 | x | x | x | o | o | o | o |
| 0.30 | 0.084 | x | x | x | o | o | o | o |
| 0.25 | 0.067 | x | x | o | o | o | o | o |
| 0.20 | 0.050 | x | o | o | o | o | o | o |

475 nm / 500 nm Blue PL

TABLE 85

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | o |
| 0.51 | 0.157 | x | x | x | x | x | x | o |
| 0.48 | 0.135 | x | x | x | x | x | o | o |
| 0.41 | 0.118 | x | x | x | x | x | o | o |
| 0.35 | 0.101 | x | x | x | x | o | o | o |
| 0.30 | 0.084 | x | x | x | x | o | o | o |
| 0.25 | 0.067 | x | x | x | o | o | o | o |
| 0.20 | 0.050 | x | x | o | o | o | o | o |

475 nm / 500 nm Blue PL

TABLE 86

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | o |
| 0.51 | 0.157 | x | x | x | x | x | x | o |
| 0.48 | 0.135 | x | x | x | x | x | o | o |
| 0.41 | 0.118 | x | x | x | x | x | o | o |
| 0.35 | 0.101 | x | x | x | x | o | o | o |
| 0.30 | 0.084 | x | x | x | x | o | o | o |
| 0.25 | 0.067 | x | x | x | o | o | o | o |
| 0.20 | 0.050 | x | x | o | o | o | o | o |

475 nm / 500 nm Blue PL

TABLE 87

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | o |
| 0.51 | 0.157 | x | x | x | x | x | x | o |
| 0.48 | 0.135 | x | x | x | x | x | o | o |
| 0.41 | 0.118 | x | x | x | x | o | o | o |
| 0.35 | 0.101 | x | x | x | x | o | o | o |
| 0.30 | 0.084 | x | x | x | o | o | o | o |
| 0.25 | 0.067 | x | x | x | o | o | o | o |
| 0.20 | 0.050 | x | x | o | o | o | o | o |

475 nm / 500 nm Blue PL

TABLE 88

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | o |
| 0.51 | 0.157 | x | x | x | x | x | x | o |
| 0.48 | 0.135 | x | x | x | x | x | o | o |
| 0.41 | 0.118 | x | x | x | x | o | o | o |
| 0.35 | 0.101 | x | x | x | o | o | o | o |
| 0.30 | 0.084 | x | x | x | o | o | o | o |
| 0.25 | 0.067 | x | x | o | o | o | o | o |
| 0.20 | 0.050 | x | o | o | o | o | o | o |

475 nm / 500 nm Blue PL

TABLE 89

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | o |
| 0.51 | 0.157 | x | x | x | x | x | x | o |
| 0.48 | 0.135 | x | x | x | x | x | o | o |
| 0.41 | 0.118 | x | x | x | x | o | o | o |
| 0.35 | 0.101 | x | x | x | o | o | o | o |
| 0.30 | 0.084 | x | x | x | o | o | o | o |
| 0.25 | 0.067 | x | x | o | o | o | o | o |
| 0.20 | 0.050 | x | o | o | o | o | o | o |

475 nm / 500 nm Blue PL

TABLE 90

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | o |
| 0.51 | 0.157 | x | x | x | x | x | x | o |
| 0.48 | 0.135 | x | x | x | x | x | o | o |
| 0.41 | 0.118 | x | x | x | x | o | o | o |
| 0.35 | 0.101 | x | x | x | o | o | o | o |
| 0.30 | 0.084 | x | x | x | o | o | o | o |
| 0.25 | 0.067 | x | x | o | o | o | o | o |
| 0.20 | 0.050 | x | o | o | o | o | o | o |

475 nm / 500 nm Blue PL

TABLE 91

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | ○ |
| 0.51 | 0.157 | x | x | x | x | x | x | ○ |
| 0.48 | 0.135 | x | x | x | x | x | ○ | ○ |
| 0.41 | 0.118 | x | x | x | x | ○ | ○ | ○ |
| 0.35 | 0.101 | x | x | x | ○ | ○ | ○ | ○ |
| 0.30 | 0.084 | x | x | x | ○ | ○ | ○ | ○ |
| 0.25 | 0.067 | x | x | ○ | ○ | ○ | ○ | ○ |
| 0.20 | 0.050 | x | ○ | ○ | ○ | ○ | ○ | ○ |
| 475 nm Blue PL | 500 nm | | | | | | | |

TABLE 92

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | ○ |
| 0.51 | 0.157 | x | x | x | x | x | ○ | ○ |
| 0.48 | 0.135 | x | x | x | x | ○ | ○ | ○ |
| 0.41 | 0.118 | x | x | x | ○ | ○ | ○ | ○ |
| 0.35 | 0.101 | x | x | x | ○ | ○ | ○ | ○ |
| 0.30 | 0.084 | x | x | ○ | ○ | ○ | ○ | ○ |
| 0.25 | 0.067 | x | ○ | ○ | ○ | ○ | ○ | ○ |
| 0.20 | 0.050 | x | ○ | ○ | ○ | ○ | ○ | ○ |
| 475 nm Blue PL | 500 nm | | | | | | | |

TABLE 93

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | ○ |
| 0.51 | 0.157 | x | x | x | x | x | ○ | ○ |
| 0.48 | 0.135 | x | x | x | x | ○ | ○ | ○ |
| 0.41 | 0.118 | x | x | x | ○ | ○ | ○ | ○ |
| 0.35 | 0.101 | x | x | x | ○ | ○ | ○ | ○ |
| 0.30 | 0.084 | x | x | ○ | ○ | ○ | ○ | ○ |
| 0.25 | 0.067 | x | ○ | ○ | ○ | ○ | ○ | ○ |
| 0.20 | 0.050 | x | ○ | ○ | ○ | ○ | ○ | ○ |
| 475 nm Blue PL | 500 nm | | | | | | | |

TABLE 94

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | ○ |
| 0.51 | 0.157 | x | x | x | x | x | ○ | ○ |
| 0.48 | 0.135 | x | x | x | x | ○ | ○ | ○ |
| 0.41 | 0.118 | x | x | x | x | ○ | ○ | ○ |
| 0.35 | 0.101 | x | x | x | ○ | ○ | ○ | ○ |
| 0.30 | 0.084 | x | x | ○ | ○ | ○ | ○ | ○ |
| 0.25 | 0.067 | x | ○ | ○ | ○ | ○ | ○ | ○ |
| 0.20 | 0.050 | x | ○ | ○ | ○ | ○ | ○ | ○ |
| 475 nm Blue PL | 500 nm | | | | | | | |

TABLE 95

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | ○ |
| 0.51 | 0.157 | x | x | x | x | x | ○ | ○ |
| 0.48 | 0.135 | x | x | x | ○ | ○ | ○ | ○ |
| 0.41 | 0.118 | x | x | x | ○ | ○ | ○ | ○ |
| 0.35 | 0.101 | x | x | ○ | ○ | ○ | ○ | ○ |
| 0.30 | 0.084 | x | x | ○ | ○ | ○ | ○ | ○ |
| 0.25 | 0.067 | x | ○ | ○ | ○ | ○ | ○ | ○ |
| 0.20 | 0.050 | x | ○ | ○ | ○ | ○ | ○ | ○ |
| 475 nm Blue PL | 500 nm | | | | | | | |

TABLE 96

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | ○ |
| 0.51 | 0.157 | x | x | x | x | x | ○ | ○ |
| 0.48 | 0.135 | x | x | x | ○ | ○ | ○ | ○ |
| 0.41 | 0.118 | x | x | x | ○ | ○ | ○ | ○ |
| 0.35 | 0.101 | x | x | ○ | ○ | ○ | ○ | ○ |
| 0.30 | 0.084 | x | x | ○ | ○ | ○ | ○ | ○ |
| 0.25 | 0.067 | x | ○ | ○ | ○ | ○ | ○ | ○ |
| 0.20 | 0.050 | x | ○ | ○ | ○ | ○ | ○ | ○ |
| 475 nm Blue PL | 500 nm | | | | | | | |

TABLE 97

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | ○ |
| 0.51 | 0.157 | x | x | x | x | x | ○ | ○ |
| 0.48 | 0.135 | x | x | x | ○ | ○ | ○ | ○ |
| 0.41 | 0.118 | x | x | x | ○ | ○ | ○ | ○ |
| 0.35 | 0.101 | x | x | ○ | ○ | ○ | ○ | ○ |
| 0.30 | 0.084 | x | x | ○ | ○ | ○ | ○ | ○ |
| 0.25 | 0.067 | x | ○ | ○ | ○ | ○ | ○ | ○ |
| 0.20 | 0.050 | x | ○ | ○ | ○ | ○ | ○ | ○ |
| 475 nm Blue PL | 500 nm | | | | | | | |

TABLE 98

| GCF | 475 nm / 525 nm / 600 nm | 16-16 / 83-81.5 / 30-28 | 16-11 / 81.5-80 / 28-22 | 11-8 / 80-78 / 22-17 | 8-6.5 / 78-75 / 17-14 | 6.5-5.5 / 75-73 / 14-11 | 5.5-4 / 73-70 / 11-9 | 4-3 / 70-67 / 9-7 |
|---|---|---|---|---|---|---|---|---|
| 0.56 | 0.170 | x | x | x | x | x | x | ○ |
| 0.51 | 0.157 | x | x | x | x | ○ | ○ | ○ |
| 0.48 | 0.135 | x | x | x | ○ | ○ | ○ | ○ |
| 0.41 | 0.118 | x | x | x | ○ | ○ | ○ | ○ |
| 0.35 | 0.101 | x | x | ○ | ○ | ○ | ○ | ○ |
| 0.30 | 0.084 | x | ○ | ○ | ○ | ○ | ○ | ○ |
| 0.25 | 0.067 | x | ○ | ○ | ○ | ○ | ○ | ○ |
| 0.20 | 0.050 | x | ○ | ○ | ○ | ○ | ○ | ○ |
| 475 nm Blue PL | 500 nm | | | | | | | |

It is to be noted that the simulations of [Table 78], [Table 85], and [Table 92] were carried out while the transmission factor of the red color filter ranged from 27% to 32% at the wavelength of 580 nm and from 78% to 81% at the wavelength of 600 nm.

Meanwhile, the simulations of [Table 79], [Table 86], and [Table 93] were carried out while the transmission factor of the red color filter ranged from 22% to 27% at the wavelength of 580 nm and from 75% to 78% at the wavelength of 600 nm.

The simulations of [Table 80], [Table 87], and [Table 94] were carried out while the transmission factor of the red color filter ranged from 18% to 22% at the wavelength of 580 nm and from 72% to 75% at the wavelength of 600 nm.

The simulations of [Table 81], [Table 88], and [Table 95] were carried out while the transmission factor of the red color filter ranged from 15% to 18% at the wavelength of 580 nm and from 69% to 72% at the wavelength of 600 nm.

The simulations of [Table 82], [Table 89], and [Table 96] were carried out while the transmission factor of the red color filter ranged from 13% to 15% at the wavelength of 580 nm and from 66% to 69% at the wavelength of 600 nm.

The simulations of [Table 83], [Table 90], and [Table 97] were carried out while the transmission factor of the red color filter ranged from 10% to 13% at the wavelength of 580 nm and from 64% to 66% at the wavelength of 600 nm.

The simulations of [Table 84], [Table 91], and [Table 98] were carried out while the transmission factor of the red color filter ranged from 8% to 10% at the wavelength of 580 nm and from 62% to 64% at the wavelength of 600 nm.

From the results given above, it is possible to calculate the chromaticity points $(x_R, y_R)$ and $(x_G, y_G)$ regarding red and green and select an apparatus configuration that the imaginary straight line interconnecting the chromaticity points $(x_R, y_R)$ and $(x_G, y_G)$ passes only those points which are equal to or higher than (0.300, 0.600) with regard to at least one of the x-axis component and the y-axis component of the chromaticity coordinate system.

As an example of the display apparatus 1 having the configuration described hereinabove with reference to FIG. 1, a display apparatus having the following configuration was produced. In particular, for the white light sources, a CCFL having a chromaticity of (0.245, 0.190) is used; for the red fluorescent material, a material having a composition represented by the [Chemical formula 9] given hereinabove is used; for the second color filter, a green color filter which has transmission characteristics of 7.8% at 475 nm, 77% at 525 nm, and 16% at 600 nm is used; for the first color filter, a red color filter which has transmission characteristics of 19% at 580 nm and 72% at 600 nm is used; and for the blue fluorescent material, a material having a composition represented by a [Chemical formula 13] given hereinbelow and having characteristics of 0.249 at 475 nm and 0.050 at 500 nm is used. Then, the display apparatus was used to carry out measurement of the green chromaticity point and the red chromaticity point with regard to output light from the display apparatus.

As a result of the measurement of the chromaticity, a green chromaticity point of (0.212, 0.673) and a red chromaticity point of (0.658, 0.326) were obtained. It was confirmed successfully that, if the two chromaticity points are interconnected on the chromaticity coordinate system, then the imaginary straight line passes only those points which are equal to or higher than the green chromaticity point (0.300, 0.600) of the sRGB standards with regard to at least one of the x-axis component and the y-axis component of the chromaticity coordinate system. This result coincides also with the simulation result presented in [Table 3] given hereinabove.

As a comparative example with the display apparatus of the present working example, a display apparatus having the following configuration was produced. In particular, for the white light sources, a CCFL of a chromaticity of (0.242, 0.200) is used; for the red fluorescent material, a material having a composition represented by the [Chemical formula 10] given hereinabove is used; for the second color filter, a green color filter which has transmission characteristics of 7.8% at 475 nm, 77% at 525 nm, and 16% at 600 nm is used; for the first color filter, a red color filter which has transmission characteristics of 19% at 580 nm and 71% at 600 nm is used; and for the blue fluorescent material, a material having a composition represented by the [Chemical formula 8] given hereinabove and having characteristics of 0.56 at 475 nm and 1.70 at 500 nm is used. Then, the display apparatus was used to carry out measurement of the green chromaticity point and the red chromaticity point with regard to output light from the display apparatus. As a result of the measurement of the chromaticity, a green chromaticity point of (0.188, 0.651) and a red chromaticity point of (0.668, 0.316) were obtained. It was confirmed successfully that, if the two chromaticity points are interconnected on the chromaticity coordinate system, then the imaginary straight line passes those points which are lower than the green chromaticity point (0.300, 0.600) of the sRGB standards with regard to both of the x-axis component and the y-axis component of the chromaticity coordinate system. This result coincides also with the simulation result presented in [Table 31] given hereinabove.

As described above in connection with the embodiment and the working examples, with the display apparatus according to the present application, while a sufficient luminance is maintained, a color reproduction performance which is ready for a predetermined chromaticity point (for example, prescribed by the sRGB standards) can be achieved. For example, where the embodiment is applied to a display apparatus which includes a backlight system for which a CCFL is used, the white color luminance can be increased without deteriorating the color reproduction range by suitable cooperation with an optical apparatus having a liquid crystal layer.

It is to be noted that the used materials and numerical conditions such as the amounts, processing times, dimensions, and so forth of the materials specified in the description of the embodiment and the working examples are mere preferable examples, and also the dimensions, shapes, and arrangement relationships described with reference to the drawings are schematic examples. In other words, the present application is not restricted to any of the embodiment and the working examples, but various modifications and alterations may be made to the embodiment and the working examples.

For example, in the embodiment described hereinabove, a fluorescent material (BAM:Eu) having a composition represented by the [Chemical formula 12] is used as a blue fluorescent material for a reference. However, the display apparatus according to the embodiment may be configured otherwise using at least one of fluorescent materials individually having compositions represented by [Chemical formula 13] to [Chemical formula 19] given below as the blue fluorescent material. It is to be noted that the selection of a blue fluorescent material is preferably carried out strictly based on the light emission central wavelength and the spectrum shape (light emission intensity distribution; particularly with regard to a skirt portion) as well as the transmission factor of the color filters and the white chromaticity of the white light source.

$Sr_5(PO_4)_3Cl:Eu$                                                  [Chemical formula 13]

$(Sr,Ca,Ba)_5(PO_4)_3Cl:Eu$                                  [Chemical formula 14]

$Sr_2O_2O_7:Eu$                                                  [Chemical formula 15]

SrMgO$_2$O$_7$:Eu   [Chemical formula 16]

Ba$_3$MgSi$_2$O$_8$:Eu   [Chemical formula 17]

(Sr,Ba)Al$_2$Si$_2$O$_2$:Eu   [Chemical formula 18]

SrMgAl$_{10}$O$_{17}$:Eu   [Chemical formula 19]

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display apparatus, comprising:
a light source apparatus including a white light source, a blue fluorescent material, a green fluorescent material having a composition represented by:

BaMgAl$_{10}$O$_{17}$:Eu, Mn, a red fluorescent material, a green color filter, and a red color filter;
wherein a green chromaticity point of an output of green light to be emitted from said green fluorescent material and a red chromaticity point of an output of red light to be emitted from said red fluorescent material on a chromaticity coordinate system are interconnected by an imaginary straight line which passes only points which are equal to or higher than (0.300, 0.600) with regard to at least one of an x-axis component and a y-axis component of the chromaticity coordinate system, and
wherein the green chromaticity point is located at a center of a range defining the output of green light to be emitted from said green fluorescent material, and the red chromaticity point is located at a center of a range defining the output of red light to be emitted from said red fluorescent material.

2. The display apparatus according claim 1, wherein said red fluorescent material has a composition represented by:

Y$_2$O$_3$:Eu.

3. The display apparatus according claim 1, wherein said red fluorescent material has a composition represented by:

YVO$_4$:Eu, or

Y(V,P)O$_4$:Eu.

4. The display apparatus according claim 1, further comprising:
an optical apparatus including a liquid crystal layer for modulating light from said light source apparatus, said white light source of said light source apparatus being a cold cathode fluorescent lamp.

5. The display apparatus according claim 1, wherein the green chromaticity point of the output of said green fluorescent material is defined based on a light emission spectrum shape of said blue fluorescent material, a transmission spectrum shape of said green color filter, a transmission spectrum shape of said red color filter, and the white chromaticity of said white light source.

6. The display apparatus according claim 2, wherein the white chromaticity of said white light source is (0.2405≦x<0.2468, 0.1802≦y<0.2148) on the chromaticity coordinate system;
the transmission factor of said green color filter is equal to or higher than 3% but equal to or lower than 11% at the wavelength of 475 nm, equal to or higher than 67% but equal to or lower than 80% at the wavelength of 525 nm, and equal to or higher than 7% but equal to or lower than 22% at the wavelength of 600 nm;
the transmission factor of said red color filter is equal to or higher than 8% but equal to or lower than 32% at the wavelength of 580 nm and equal to or higher than 62% but equal to or lower than 81% at the wavelength of 600 nm; and
the light emission intensity of said blue fluorescent material is equal to or higher than 20% but equal to or lower than 30% at the wavelength of 475 nm and equal to or higher than 5% but equal to or lower than 8.4% at the wavelength of 500 nm with respect to the maximum light emission intensity of said blue fluorescent material.

7. The display apparatus according claim 2, wherein the white chromaticity of said white light source is (0.2405≦x<0.2468, 0.1802≦y<0.2148) on the chromaticity coordinate system;
the transmission factor of said green color filter is equal to or higher than 3% but equal to or lower than 5.5% at the wavelength of 475 nm, equal to or higher than 67% but equal to or lower than 73% at the wavelength of 525 nm, and equal to or higher than 7% but equal to or lower than 11% at the wavelength of 600 nm;
the transmission factor of said red color filter is equal to or higher than 8% but equal to or lower than 32% at the wavelength of 580 nm and equal to or higher than 62% but equal to or lower than 81% at the wavelength of 600 nm; and
the light emission intensity of said blue fluorescent material is equal to or higher than 20% but equal to or lower than 41% at the wavelength of 475 nm and equal to or higher than 5% but equal to or lower than 11.8% at the wavelength of 500 nm with respect to the maximum light emission intensity of said blue fluorescent material.

8. The display apparatus according claim 2, wherein the white chromaticity of said white light source is (0.2405≦x<0.2468, 0.1802≦y<0.2148) on the chromaticity coordinate system;
the transmission factor of said green color filter is equal to or higher than 3% but equal to or lower than 4% at the wavelength of 475 nm, and equal to or higher than 67% but equal to or lower than 70% at the wavelength of 525 nm, and equal to or higher than 7% but equal to or lower than 9% at the wavelength of 600 nm;
the transmission factor of said red color filter is equal to or higher than 8% but equal to or lower than 32% at the wavelength of 580 nm and equal to or higher than 62% but equal to or lower than 81% at the wavelength of 600 nm; and
the light emission intensity of said blue fluorescent material is equal to or higher than 20% but equal to or lower than 51% at the wavelength of 475 nm and equal to or higher than 5% but equal to or lower than 15.2% at the wavelength of 500 nm with respect to the maximum light emission intensity of said blue fluorescent material.

9. The display apparatus according claim 3, wherein the white chromaticity of said white light source is (0.2304≦x<0.2522, 0.1805≦y<0.2143) on the chromaticity coordinate system;
the transmission factor of said green color filter is equal to or higher than 3% but equal to or lower than 6.5% at the wavelength of 475 nm, equal to or higher than 67% but equal to or lower than 76% at the wavelength of 525 nm, and equal to or higher than 7% but equal to or lower than 14% at the wavelength of 600 nm;

the transmission factor of said red color filter is equal to or higher than 18% but equal to or lower than 32% at the wavelength of 580 nm and equal to or higher than 72% but equal to or lower than 81% at the wavelength of 600 nm; and the light emission intensity of said blue fluorescent material is equal to or higher than 20% but equal to or lower than 30% at the wavelength of 475 nm and equal to or higher than 5% but equal to or lower than 8.4% at the wavelength of 500 nm with respect to the maximum light emission intensity of said blue fluorescent material.

10. The display apparatus according claim 3, wherein the white chromaticity of said white light source is ($0.2304 \leq x < 0.2522$, $0.1805 \leq y < 0.2143$) on the chromaticity coordinate system;

the transmission factor of said green color filter is equal to or higher than 3% but equal to or lower than 5.5% at the wavelength of 475 nm, equal to or higher than 67% but equal to or lower than 73% at the wavelength of 525 nm, and equal to or higher than 7% but equal to or lower than 11% at the wavelength of 600 nm;

the transmission factor of said red color filter is equal to or higher than 18% but equal to or lower than 32% at the wavelength of 580 nm and equal to or higher than 72% but equal to or lower than 81% at the wavelength of 600 nm; and the light emission intensity of said blue fluorescent material is equal to or higher than 30% but equal to or lower than 35% at the wavelength of 475 nm and equal to or higher than 8.4% but equal to or lower than 10.1% at the wavelength of 500 nm with respect to the maximum light emission intensity of said blue fluorescent material.

11. The display apparatus according claim 3, wherein the white chromaticity of said white light source is ($0.2304 \leq x < 0.2522$, $0.1805 \leq y < 0.2143$) on the chromaticity coordinate system;

the transmission factor of said green color filter is equal to or higher than 3% but equal to or lower than 4% at the wavelength of 475 nm and equal to or higher than 67% but equal to or lower than 70% at the wavelength of 525 nm, and equal to or higher than 7% but equal to or lower than 9% at the wavelength of 600 nm;

the transmission factor of said red color filter is equal to or higher than 18% but equal to or lower than 32% at the wavelength of 580 nm and equal to or higher than 72% but equal to or lower than 81% at the wavelength of 600 nm; and the light emission intensity of said blue fluorescent material is equal to or higher than 30% but equal to or lower than 41% at the wavelength of 475 nm and equal to or higher than 10.1% but equal to or lower than 11.8% at the wavelength of 500 nm with respect to the maximum light emission intensity of said blue fluorescent material.

12. The display apparatus according claim 3, wherein the white chromaticity of said white light source is ($0.2304 \leq x < 0.2522$, $0.1805 \leq y < 0.2143$) on the chromaticity coordinate system;

the transmission factor of said green color filter is equal to or higher than 3% but equal to or lower than 8% at the wavelength of 475 nm, equal to or higher than 67% but equal to or lower than 78% at the wavelength of 525 nm, and equal to or higher than 7% but equal to or lower than 17% at the wavelength of 600 nm;

the transmission factor of said red color filter is equal to or higher than 13% but equal to or lower than 18% at the wavelength of 580 nm and equal to or higher than 66% but equal to or lower than 72% at the wavelength of 600 nm; and the light emission intensity of said blue fluorescent material is equal to or higher than 20% but equal to or lower than 25% at the wavelength of 475 nm and equal to or higher than 5% but equal to or lower than 6.7% at the wavelength of 500 nm with respect to the maximum light emission intensity of said blue fluorescent material.

13. The display apparatus according claim 3, wherein the white chromaticity of said white light source is ($0.2304 \leq x < 0.2522$, $0.1805 \leq y < 0.2143$) on the chromaticity coordinate system;

the transmission factor of said green color filter is equal to or higher than 3% but equal to or lower than 6.5% at the wavelength of 475 nm, equal to or higher than 67% but equal to or lower than 76% at the wavelength of 525 nm, and equal to or higher than 7% but equal to or lower than 14% at the wavelength of 600 mm;

the transmission factor of said red color filter is equal to or higher than 13% but equal to or lower than 18% at the wavelength of 580 nm and equal to or higher than 66% but equal to or lower than 72% at the wavelength of 600 nm; and the light emission intensity of said blue fluorescent material is equal to or higher than 25% but equal to or lower than 30% at the wavelength of 475 nm and equal to or higher than 6.7% but equal to or lower than 8.4% at the wavelength of 500 nm with respect to the maximum light emission intensity of said blue fluorescent material.

14. The display apparatus according claim 3, wherein the white chromaticity of said white light source is ($0.2304 \leq x < 0.2522$, $0.1805 \leq y < 0.2143$) on the chromaticity coordinate system;

the transmission factor of said green color filter is equal to or higher than 3% but equal to or lower than 5.5% at the wavelength of 475 nm, equal to or higher than 67% but equal to or lower than 73% at the wavelength of 525 nm, and equal to or higher than 7% but equal to or lower than 11% at the wavelength of 600 mm;

the transmission factor of said red color filter is equal to or higher than 13% but equal to or lower than 18% at the wavelength of 580 nm and equal to or higher than 66% but equal to or lower than 72% at the wavelength of 600 nm; and the light emission intensity of said blue fluorescent material is equal to or higher than 30% but equal to or lower than 41% at the wavelength of 475 nm and equal to or higher than 8.4% but equal to or lower than 11.8% at the wavelength of 500 nm with respect to the maximum light emission intensity of said blue fluorescent material.

15. The display apparatus according claim 3, wherein the white chromaticity of said white light source is ($0.2304 \leq x < 0.2522$, $0.1805 \leq y < 0.2143$) on the chromaticity coordinate system;

the transmission factor of said green color filter is equal to or higher than 3% but equal to or lower than 4% at the wavelength of 475 nm, equal to or higher than 67% but equal to or lower than 70% at the wavelength of 525 nm, and equal to or higher than 7% but equal to or lower than 9% at the wavelength of 600 nm;

the transmission factor of said red color filter is equal to or higher than 13% but equal to or lower than 18% at the wavelength of 580 nm and equal to or higher than 66% but equal to or lower than 72% at the wavelength of 600 nm; and the light emission intensity of said blue fluorescent material is equal to or higher than 41% but equal to or lower than 46% at the wavelength of 475 nm and equal to or higher than 11.8% but equal to or lower than 13.5% at the wavelength of 500 nm with respect to the maximum light emission intensity of said blue fluorescent material.

16. The display apparatus according claim 3, wherein the white chromaticity of said white light source is (0.2304≦x<0.2522, 0.1805≦y<0.2143) on the chromaticity coordinate system;
the transmission factor of said green color filter is equal to or higher than 3% but equal to or lower than 16% at the wavelength of 475 nm, equal to or higher than 67% but equal to or lower than 81.5% at the wavelength of 525 nm, and equal to or higher than 7% but equal to or lower than 26% at the wavelength of 600 nm;
the transmission factor of said red color filter is equal to or higher than 8% but equal to or lower than 13% at the wavelength of 580 nm and equal to or higher than 62% but equal to or lower than 66% at the wavelength of 600 nm; and
the light emission intensity of said blue fluorescent material is equal to or higher than 20% but equal to or lower than 25% at the wavelength of 475 nm and equal to or higher than 5% but equal to or lower than 6.7% at the wavelength of 500 nm with respect to the maximum light emission intensity of said blue fluorescent material.

17. The display apparatus according claim 3, wherein the white chromaticity of said white light source is (0.2304≦x<0.2522, 0.1805≦y<0.2143) on the chromaticity coordinate system;
the transmission factor of said green color filter is equal to or higher than 3% but equal to or lower than 11% at the wavelength of 475 nm, equal to or higher than 67% but equal to or lower than 80% at the wavelength of 525 nm, and equal to or higher than 7% but equal to or lower than 22% at the wavelength of 600 nm;
the transmission factor of said red color filter is equal to or higher than 8% but equal to or lower than 13% at the wavelength of 580 nm and equal to or higher than 62% but equal to or lower than 66% at the wavelength of 600 nm; and
the light emission intensity of said blue fluorescent material is equal to or higher than 20% but equal to or lower than 30% at the wavelength of 475 nm and equal to or higher than 6.7% but equal to or lower than 8.4% at the wavelength of 500 nm with respect to the maximum light emission intensity of said blue fluorescent material.

18. The display apparatus according claim 3, wherein the white chromaticity of said white light source is (0.2304≦x<0.2522, 0.1805≦y<0.2143) on the chromaticity coordinate system;
the transmission factor of said green color filter is equal to or higher than 3% but equal to or lower than 6.5% at the wavelength of 475 nm, equal to or higher than 67% but equal to or lower than 76% at the wavelength of 525 nm, and equal to or higher than 7% but equal to or lower than 14% at the wavelength of 600 nm;
the transmission factor of said red color filter is equal to or higher than 8% but equal to or lower than 13% at the wavelength of 580 nm and equal to or higher than 62% but equal to or lower than 66% at the wavelength of 600 nm; and
the light emission intensity of said blue fluorescent material is equal to or higher than 30% but equal to or lower than 35% at the wavelength of 475 nm and equal to or higher than 8.4% but equal to or lower than 10.1% at the wavelength of 500 nm with respect to the maximum light emission intensity of said blue fluorescent material.

19. The display apparatus according claim 3, wherein the white chromaticity of said white light source is (0.2304≦x<0.2522, 0.1805≦y<0.2143) on the chromaticity coordinate system;
the transmission factor of said green color filter is equal to or higher than 3% but equal to or lower than 5.5% at the wavelength of 475 nm, equal to or higher than 67% but equal to or lower than 73% at the wavelength of 525 nm and, equal to or higher than 7% but equal to or lower than 11% at the wavelength of 600 mm;
the transmission factor of said red color filter is equal to or higher than 8% but equal to or lower than 13% at the wavelength of 580 nm and equal to or higher than 62% but equal to or lower than 66% at the wavelength of 600 nm; and
the light emission intensity of said blue fluorescent material is equal to or higher than 35% but equal to or lower than 41% at the wavelength of 475 nm and equal to or higher than 10.1% but equal to or lower than 11.8% at the wavelength of 500 nm with respect to the maximum light emission intensity of said blue fluorescent material.

20. The display apparatus according claim 3, wherein the white chromaticity of said white light source is (0.2304≦x<0.2522, 0.1805≦y<0.2143) on the chromaticity coordinate system;
the transmission factor of said green color filter is equal to or higher than 3% but equal to or lower than 4% at the wavelength of 475 nm, equal to or higher than 67% but equal to or lower than 70% at the wavelength of 525 nm and, equal to or higher than 7% but equal to or lower than 9% at the wavelength of 600 nm;
the transmission factor of said red color filter is equal to or higher than 8% but equal to or lower than 13% at the wavelength of 580 nm and equal to or higher than 62% but equal to or lower than 66% at the wavelength of 600 nm; and
the light emission intensity of said blue fluorescent material is equal to or higher than 41% but equal to or lower than 46% at the wavelength of 475 nm and equal to or higher than 11.8% but equal to or lower than 13.5% at the wavelength of 500 nm with respect to the maximum light emission intensity of said blue fluorescent material.

* * * * *